United States Patent
Matsumoto et al.

(10) Patent No.: US 9,570,978 B2
(45) Date of Patent: Feb. 14, 2017

(54) POWER SUPPLY CONTROL DEVICE FOR INDUCTIVE LOADS

(71) Applicant: Mitsubishi Electric Corporation, Chiyoda-ku, Tokyo (JP)

(72) Inventors: Shuichi Matsumoto, Chiyoda-ku (JP); Masao Motonobu, Chiyoda-ku (JP); Masahiko Sayama, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 561 days.

(21) Appl. No.: 14/172,228

(22) Filed: Feb. 4, 2014

(65) Prior Publication Data
US 2015/0102672 A1    Apr. 16, 2015

(30) Foreign Application Priority Data
Oct. 15, 2013    (JP) ................. 2013-214335

(51) Int. Cl.
| | | |
|---|---|---|
| H02J 1/00 | (2006.01) | |
| H02M 3/156 | (2006.01) | |
| H02M 1/08 | (2006.01) | |
| H02M 1/32 | (2007.01) | |
| H02M 1/36 | (2007.01) | |

(Continued)

(52) U.S. Cl.
CPC ........... *H02M 3/156* (2013.01); *H02M 1/08* (2013.01); *H02M 1/32* (2013.01); *H02M 1/36* (2013.01); *H02M 3/157* (2013.01); *H02M 2001/0006* (2013.01); *H02M 2001/008* (2013.01); *Y10T 307/406* (2015.04)

(58) Field of Classification Search
CPC .......... H02M 1/08; H02M 1/32; H02M 3/156; H02M 1/36; H02M 2001/0006; H02M 2001/008; H02M 3/157; Y10T 307/406
USPC .................. 307/11, 10.1; 323/201
See application file for complete search history.

(56) References Cited

U.S. PATENT DOCUMENTS

| | | | | |
|---|---|---|---|---|
| 2006/0197508 | A1* | 9/2006 | Matsumoto | F02D 41/20 323/201 |
| 2008/0093924 | A1* | 4/2008 | Matsumoto | G01R 31/006 307/10.1 |
| 2014/0239713 | A1* | 8/2014 | Kanzaki | H02J 1/00 307/11 |

FOREIGN PATENT DOCUMENTS

| | | |
|---|---|---|
| JP | 2006-100509 A | 4/2006 |
| JP | 2006-238668 A | 9/2006 |
| JP | 2008-107157 A | 5/2008 |

* cited by examiner

*Primary Examiner* — Rexford Barnie
*Assistant Examiner* — Elim Ortiz
(74) *Attorney, Agent, or Firm* — Sughrue Mion, PLLC; Richard C. Turner

(57) ABSTRACT

In order to avoid the continuation of the abnormality control state by detecting the disconnection abnormality of the ground wiring line of a power supply control device provided between a DC power supply and a plurality of inductive loads, the power supply control device to which electric power is supplied through a power supply terminal includes a microprocessor that performs switching control of power switching elements, a constant voltage power supply, and commutation diodes connected in parallel to inductive loads, a power capacitor connected between the power supply terminal and a ground terminal is charged by the commutation current of the intermittently driven inductive loads when the ground terminal is disconnected and accordingly the voltage of the power capacitor rises, and the disconnection abnormality of the ground wiring line is detected when the voltage exceeds a predetermined threshold value and the power switching elements are simultaneously cut off.

9 Claims, 9 Drawing Sheets

(51) Int. Cl.
*H02M 3/157* (2006.01)
*H02M 1/00* (2006.01)

POWER SUPPLY CONTROL DEVICE FOR INDUCTIVE LOADS

BACKGROUND OF THE INVENTION

Field of the Invention

The present invention relates to a power supply control device for inductive loads that controls the duty ratio of a power switching element connected between a DC power supply and an inductive load. In particular, the present invention relates to an improvement of a power supply control device when ground terminals of a DC power supply, an inductive load, and a power supply control device are connected to a common ground circuit through separate ground wiring lines.

Background Art

In the related art, for example, in a linear solenoid that is a part of an in-vehicle electrical load, a power switching element is interposed at the upstream position of each of a DC power supply as a vehicle battery and a linear solenoid as a plurality of inductive loads, and an excitation current for each inductive load is variably adjusted by controlling the duty ratio of the power switching element.

As a current control device for such a known electrical load, a current control device based on an external feedback control method is disclosed in which the duty ratio of a power switching element is controlled through a comparison deviation integrating circuit, which is configured by hardware, according to a conduction command signal, which corresponds to a conduction target current that is generated by a microprocessor, and a current detection signal by a current detection resistor connected in series to the linear solenoid (for example, refer to Patent Document 1).

In addition, a current control device for an electrical load based on an internal feedback control method is disclosed in which a microprocessor that sets a conduction target current controls the duty ratio of a power switching element through comparison deviation integrating means, which is configured by software, according to a current detection signal by a current detection resistor connected in series to a linear solenoid (for example, refer to Patent Document 2).

In addition, a power supply control device for an in-vehicle electrical load is disclosed in which ground terminals of an in-vehicle electrical load, which is an inductive load, and a power supply control device therefor are connected to the vehicle body and an additional connection between the ground terminals is made by the external common negative line (for example, refer to Patent Document 3).

[Patent Document 1] JP-A-2006-100509 (FIG. 1, abstract)
[Patent Document 2] JP-A-2006-238668 (FIG. 1, abstract)
[Patent Document 3] JP-A-2008-107157 (FIG. 1, abstract)

According to Patent Documents 1 and 2 described above, negative terminals of the current control device as a power supply control device, the vehicle battery as a DC power supply, and the linear solenoid as an inductive load are connected to the vehicle body, which is a common ground circuit, through separate ground wiring lines.

In addition, the current control device has an abnormality determination function. For example, when a closing command is given to the power switching element, if no voltage is applied to the inductive load, a disconnection abnormality of the switching element or the load wiring line is determined. In addition, when an opening command is given to the power switching element, if a voltage is applied to the inductive load, a short-circuit abnormality of the switching element or a short-to-power abnormality in which the positive-side load wiring line is short-circuited to the power line is determined. Thus, abnormality detection is performed for each linear solenoid.

However, there is a problem in that the current control device performs an uncertain control operation and accordingly accurate abnormality determination cannot be performed when the disconnection abnormality of the ground wiring line occurs due to poor contact of a negative terminal connector of the current control device or the loosening of a terminal of a vehicle body connecting portion of the ground wiring line, and the like.

In addition, in the case of Patent Document 3 described above, an external common negative line other than the vehicle body ground connection needs to be added between the in-vehicle electrical load as an inductive load and the power supply control device. Accordingly, there is a problem in that the wiring cost is increased.

SUMMARY OF THE INVENTION

It is an object of the present invention to provide a power supply control device for inductive loads that does not allow an abnormal control state to be continued by detecting the occurrence of the disconnection abnormality of the ground wiring line of the power supply control device under the conditions in which ground terminals of a DC power supply, an inductive load, and a power supply control device are connected to a common ground circuit through separate ground wiring lines and additional wiring for directly connecting the ground terminals of the inductive load and the power supply control device is removed to suppress the wiring cost.

According to an aspect of the present invention, a power supply control device for inductive loads includes: a plurality of power switching elements that are provided between a DC power supply having a negative terminal connected to a ground circuit and a plurality of inductive loads and that are connected between a positive terminal of the DC power supply and a positive terminal of each of the plurality of inductive loads so as to be intermittently driven; and a microprocessor that performs switching control of at least the plurality of power switching elements. Electric power is supplied from the DC power supply to the power supply control device for inductive loads through a power supply terminal and a ground terminal. A constant voltage power supply that supplies a predetermined stabilization control voltage to the microprocessor, a power capacitor, and a voltage dividing resistor are connected in parallel to each other between the power supply terminal and the ground terminal. A commutation diode is connected between an output end of each of the plurality of power switching elements and the ground terminal. In a state where one of the plurality of power switching elements is closed and an excitation current flows through one of the plurality of inductive loads, when the closed power switching element is opened, the commutation diode is connected in a relationship in which the excitation current is commutated and attenuates through the ground terminal and the commutation diode. When a disconnection abnormality of a ground wiring line between the ground terminal and the ground circuit occurs, the excitation current flowing through one of the plurality of inductive loads flows back and attenuates through the DC power supply, the power capacitor, and the commutation diode, and the power capacitor is charged by the return current. When a monitoring voltage that is a voltage across the power capacitor rises and a monitoring divided voltage divided by the voltage dividing resistor exceeds a predetermined threshold voltage, occurrence of a disconnection abnormality of the ground wiring line between the ground terminal and the ground circuit is detected and stored, and driving command signals for the plurality of power switching elements are simultaneously stopped according to the detection and storage of the disconnection abnormality.

In the power supply control device for inductive loads according to the aspect of the present invention, a plurality of power switching elements, which are connected between the upstream positions of the plurality of inductive loads and the DC power supply, and the commutation diode, which is connected in parallel to each of the inductive loads, are provided. The power capacitor is connected between the power supply terminal and the ground terminal of the power supply control device. Focusing on the fact that the voltage across the power capacitor abnormally rises due to the flow of the excitation current of each inductive load to the power capacitor when the wiring line between the ground circuit of the DC power supply and the inductive loads and the ground terminal of the power supply control device is disconnected, the disconnection abnormality of the ground wiring line is detected. Therefore, there is an effect that the malfunction of the power supply control device can be prevented by detecting an abnormal state, in which only the ground terminal of the power supply control device is opened, in a state where the ground circuit between the DC power supply and each inductive load is formed by omitting direct wiring between the negative terminals of the power supply control device and each inductive load to suppress the wiring cost.

In addition, there is an effect that the driving of all loads can be stopped quickly by detecting and storing the occurrence of the disconnection abnormality of the ground wiring line that cannot be specified just by monitoring the power supply control state for the inductive loads separately.

The foregoing and other object, features, aspects, and advantages of the present invention will become more apparent from the following detailed description of the present invention when taken in conjunction with the accompanying drawings.

DETAILED DESCRIPTION OF THE INVENTION

First Embodiment

Figure 1:
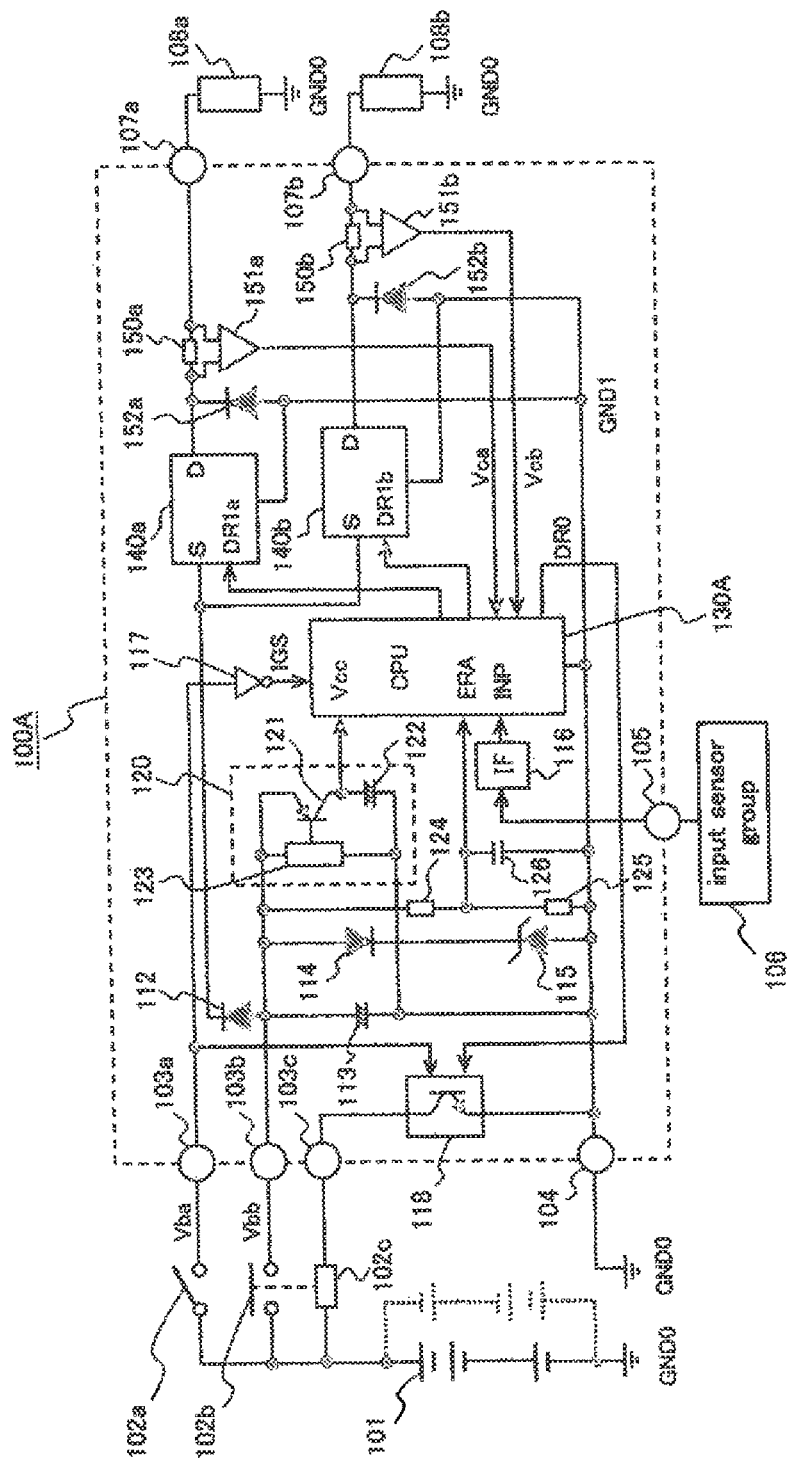
FIG. 1 is an overall circuit diagram showing a power supply control device for inductive loads according to a first embodiment of the present invention.

Hereinafter, the configuration of a first embodiment of the present invention will be described with reference to FIG. 1 that shows the entire circuit of a power supply control device for inductive loads and FIG. 2 that shows a main part configuration in FIG. 1.

First, in FIG. 1, a power supply control device 100A for inductive loads (hereinafter, simply referred to as a power supply control device) that operates with a microprocessor 130A as a main component receives electric power from a DC power supply 101 that is a vehicle battery, for example. The power supply control device 100A supplies electric power to a number of inductive loads 108a and 108b, such as a linear solenoid, to drive the inductive loads 108a and 108b.

A power supply terminal 103b of the power supply control device 100A is connected to a positive terminal of the DC power supply 101 through an output contact point 102b of a power supply relay, so that a main power supply voltage Vbb is applied to the power supply control device 100A. In addition, a power biasing terminal 103c of the power supply control device 100A is connected to the positive terminal of the DC power supply 101 through an excitation coil 102c of the power supply relay, and an auxiliary power terminal 103a of the power supply control device 100A is connected to the positive terminal of the DC power supply 101 through a power switch 102a, so that an auxiliary power voltage Vba is applied to the power supply control device 100A.

A negative terminal of the DC power supply 101, negative terminals of the inductive loads 108a and 108b, and a ground terminal 104 of the power supply control device 100A are connected to a common ground circuit GND0 that is a vehicle body, for example, through separate ground wiring lines.

In addition, an input signal INP is input from an ON/OFF sensor connected to a sensor group input terminal 105 or an input sensor group 106, which is an analog sensor, to an input port of the microprocessor 130A through an input interface circuit 116.

The power supply control device 100A is configured to include a constant voltage power supply 120, the microprocessor 130A, and power switching elements 140a and 140b as main components, and positive terminals of the power switching elements 140a and 140b are connected to the power supply terminal 103b through a reverse flow blocking diode 112.

Between the power supply terminal 103b and the ground terminal 104, a power capacitor 113 is connected, and a series circuit of a reverse flow blocking diode 114 and a second voltage limiting diode 115, a series circuit of voltage dividing resistors 124 and 125, and the constant voltage power supply 120 are connected in parallel to each other. The ground terminal 104 is connected to a ground pattern GND1 provided on a circuit board (not shown) in the power supply control device 100A.

In addition, the reverse flow blocking diodes 112 and 114 are for preventing the power supply from being short-circuited when the DC power supply 101 is connected with reverse polarities erroneously as shown by the dotted line.

In addition, the constant voltage power supply 120 generates a stabilization control voltage Vcc of, for example, DC 5V through a control transistor 121, and supplies electric power to the microprocessor 130A through a smoothing capacitor 122 provided together. A constant voltage control circuit 123 controls the conduction state of the control transistor 121 so that the value of the stabilization control voltage Vcc becomes a constant value even if the value of the main power supply voltage Vbb is changed.

An inverted logic element 117 generates a power switching signal IGS whose logic level changes to "L" when the power switch 102a is closed, and inputs the power switching signal IGS to the microprocessor 130A.

A self-holding driving circuit 118 is formed by a transistor, through which a current flows by the application of the auxiliary power voltage Vba when the power switch 102a is closed. When a current flows through the transistor, a current flows through the excitation coil 102c to close the output contact point 102b of the power supply relay.

In addition, when the microprocessor 130A is activated by the stabilization control voltage Vcc generated by the constant voltage power supply 120, a self-holding command signal DR0 is generated to maintain the closed state of the transistor of the self-holding driving circuit 118.

The divided voltage generated by the voltage dividing resistors 124 and 125 forms a voltage monitoring signal ERA through a noise absorbing capacitor 126 that forms a low pass filter, and is input to an analog input port of the microprocessor 130A.

A downstream terminal of the power switching element 140a is connected to an upstream terminal of the first inductive load 108a through a current detection resistor 150a and a first load terminal 107a, and is connected to the ground pattern GND1 through a commutation diode 152a.

Similarly, a downstream terminal of the power switching element 140b is connected to an upstream terminal of the second inductive load 108b through a current detection resistor 150b and a second load terminal 107b, and is connected to the ground pattern GND1 through a commutation diode 152b.

The voltages across the current detection resistors 150a and 150b are detected as current detection signals Vca and Vcb through differential amplifiers 151a and 151b, respectively, and the current detection signals Vca and Vcb are input to the analog input ports of the microprocessor 130A.

In addition, the power switching elements 140a and 140b are intermittently driven separately by driving command signals DR1a and DR1b generated by the microprocessor 130A. According to the duty ratio, excitation currents flowing through the inductive loads 108a and 108b are controlled.

Figure 2:
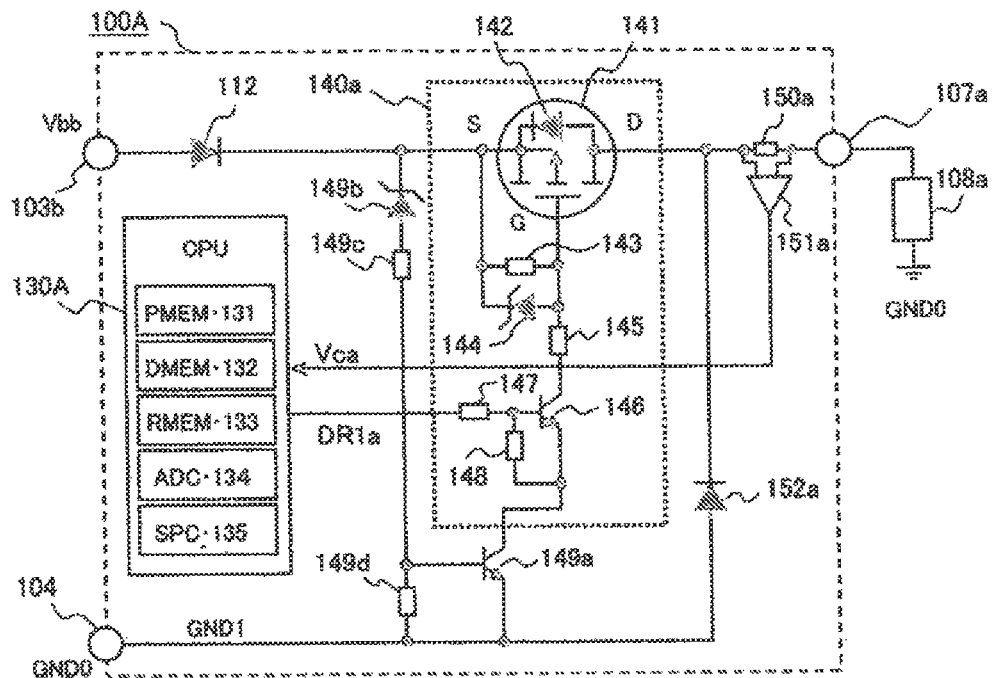
FIG. 2 is a circuit diagram showing the main part configuration in FIG. 1.

FIG. 2 shows the details of the power switching element 140a in FIG. 1. In FIG. 2, a P-channel field effect transistor having an upstream positive terminal as a source terminal S and a downstream negative terminal as a drain terminal D is used as a transistor 141. Due to a parasitic diode 142 in the transistor 141, a current flows freely in a direction from the drain terminal D to the source terminal S.

A gate resistor 143 and a constant voltage diode 144 are connected in parallel to each other between the source terminal S and the gate terminal G of the transistor 141, and a series circuit of a driving resistor 145, an auxiliary transistor 146, and a low voltage cutoff element 149a is connected between the gate terminal G and the ground pattern GND1.

A base terminal of the auxiliary transistor 146 that is an NPN junction transistor is connected to the microprocessor 130A through a base resistor 147, and is driven so as to be opened and closed by the driving command signal DR1a of the microprocessor 130A. An open ballast resistor 148 is connected between the base terminal and the emitter terminal of the auxiliary transistor 146.

A series circuit of a dropper diode 149b and a driving resistor 149c is connected between the base terminal of the low voltage cutoff element 149a, which is an NPN junction transistor, and the source terminal S of the transistor 141, and an open ballast resistor 149d is connected between the base terminal and the emitter terminal.

The dropper diode 149b cuts off the gate circuit of the transistor 141 by reducing the voltage across the power capacitor 113 in FIG. 1 before the generation of the stabilization control voltage Vcc by the constant voltage power supply 120 becomes difficult.

In addition, the power switching element 140b is formed similar to the power switching element 140a, and the low voltage cutoff element 149a is shared by the power switching elements 140a and 140b.

The microprocessor 130A includes a program memory 131 that is a nonvolatile flash memory, a nonvolatile data memory 132 that is a partial region of the program memory 131 or is additionally connected, a RAM memory 133 for arithmetic processing, a multi-channel A/D converter 134, and a serial-to-parallel converter 135 that communicates with an external device.

The multi-channel A/D converter 134 performs digital conversion of the current detection signals Vca and Vcb, which are outputs of the differential amplifiers 151a and 151b, or the analog voltage based on the voltage monitoring signal ERA in FIG. 1, and inputs the resulting signal to the microprocessor 130A.

In addition, the reverse flow blocking diode 112 is for preventing the generation of a short-circuit current, which flows from the ground terminal 104 to the power supply terminal 103b through the commutation diodes 152a and 152b and each parasitic diode 142 of the power switching elements 140a and 140b, when the DC power supply 101 is connected with reversed polarities as shown by the dotted line in FIG. 1. In practice, in order to suppress a voltage drop caused by the forward current in normal operation, it is common to use a field effect transistor in which a current flows reversely.

In addition, in the above power supply control device, the case of the two inductive loads 108a and 108b has been described. However, connections of a larger number of electrical loads, such as inductive loads or lamp loads, are common, and some of the electrical loads may be connected to a power switching element at the downstream positions of the electrical loads.

Next, the operation of the power supply control device shown in FIGS. 1 and 2 will be described in detail.

First, in FIGS. 1 and 2, the operation of the power supply control device 100A when everything is in a normal state will be described.

At the start of operation, the power switch 102a is closed. Then, a current flows from the DC power supply 101 to the self-holding driving circuit 118. Then, the excitation coil 102c is biased, and the output contact point 102b of the power supply relay is closed. As a result, the main power supply voltage Vbb is applied from the DC power supply 101 to the power supply control device 100A.

The main power supply voltage Vbb changes in a range of, for example, DC 10 V to 16 V. For this reason, the stabilization control voltage Vcc of, for example, DC 5 V is generated through the constant voltage power supply 120, and this stabilization control voltage Vcc is supplied to the microprocessor 130A.

As a result, the microprocessor 130A performs initialization processing and then starts a control operation to generate the self-holding command signal DR0 so that the conduction state of the self-holding driving circuit 118 is maintained. Thereafter, even if the power switch 102a is opened, the biasing state of the excitation coil 102c is maintained until the microprocessor 130A stops the control operation itself, and abnormality occurrence information or learning memory information written in the RAM memory 133 during the operation period is transmitted and stored in the nonvolatile data memory 132.

While the power switch 102a is closed, the microprocessor 130A performs driving control of the inductive loads 108a and 108b and a group of other electrical loads (not shown) according to the operating state of the input sensor group 106 and the content of an input/output control program stored in the program memory 131.

The microprocessor 130A determines a plurality of inductive loads 108a and 108b to which a current is to be supplied, sets a conduction target current for the determined inductive loads 108a and 108b, and generates the driving command signals DR1a and DR1b so that the value of the excitation current detected by the current detection resistors 150a and 150b matches the value of the conduction target current. In this manner, the duty ratio (ratio between the ON time and the switching period) of the power switching elements 140a and 140b is increased or decreased to perform negative feedback control.

In addition, when the power switching elements 140a and 140b to which a current is being supplied are opened, the excitation current flowing through the inductive loads 108a and 108b is commutated and attenuates through the commutation diodes 152a and 152b and the current detection resistors 150a and 150b.

Next, an operation when the disconnection abnormality of the ground wiring line occurs between the ground circuit GND0 and the ground terminal 104 of the power supply control device 100A due to poor contact of a connector (not shown) or the loosening of a terminal screw will be described with reference to FIG. 3.

Figure 3:
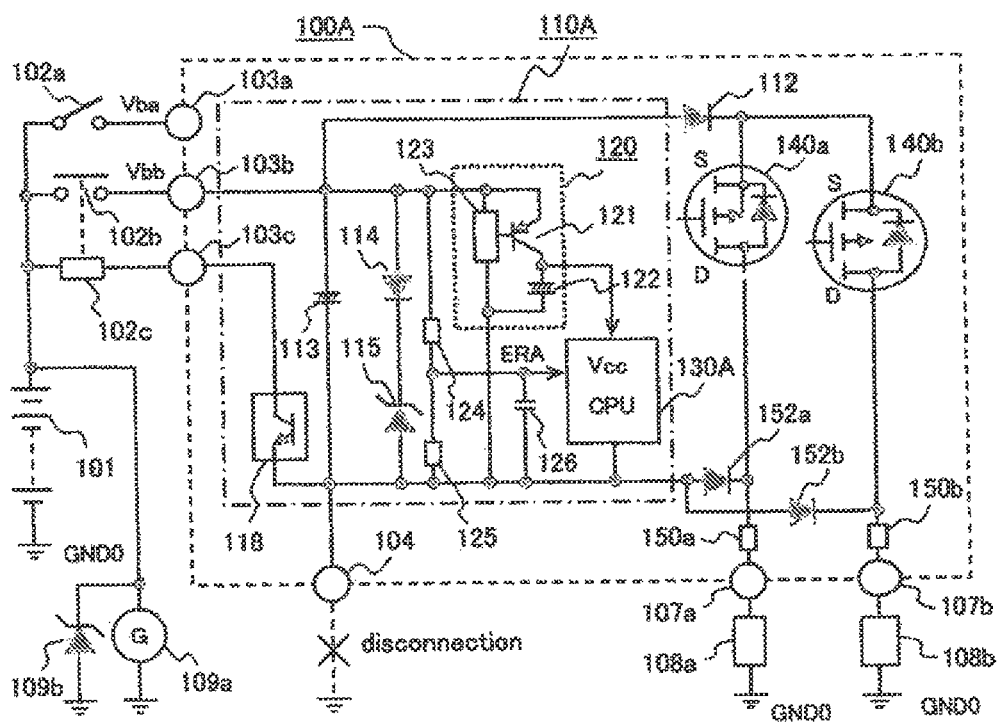
FIG. 3 is a circuit diagram for explaining the negative line disconnection state in the first embodiment.
Figure 4:
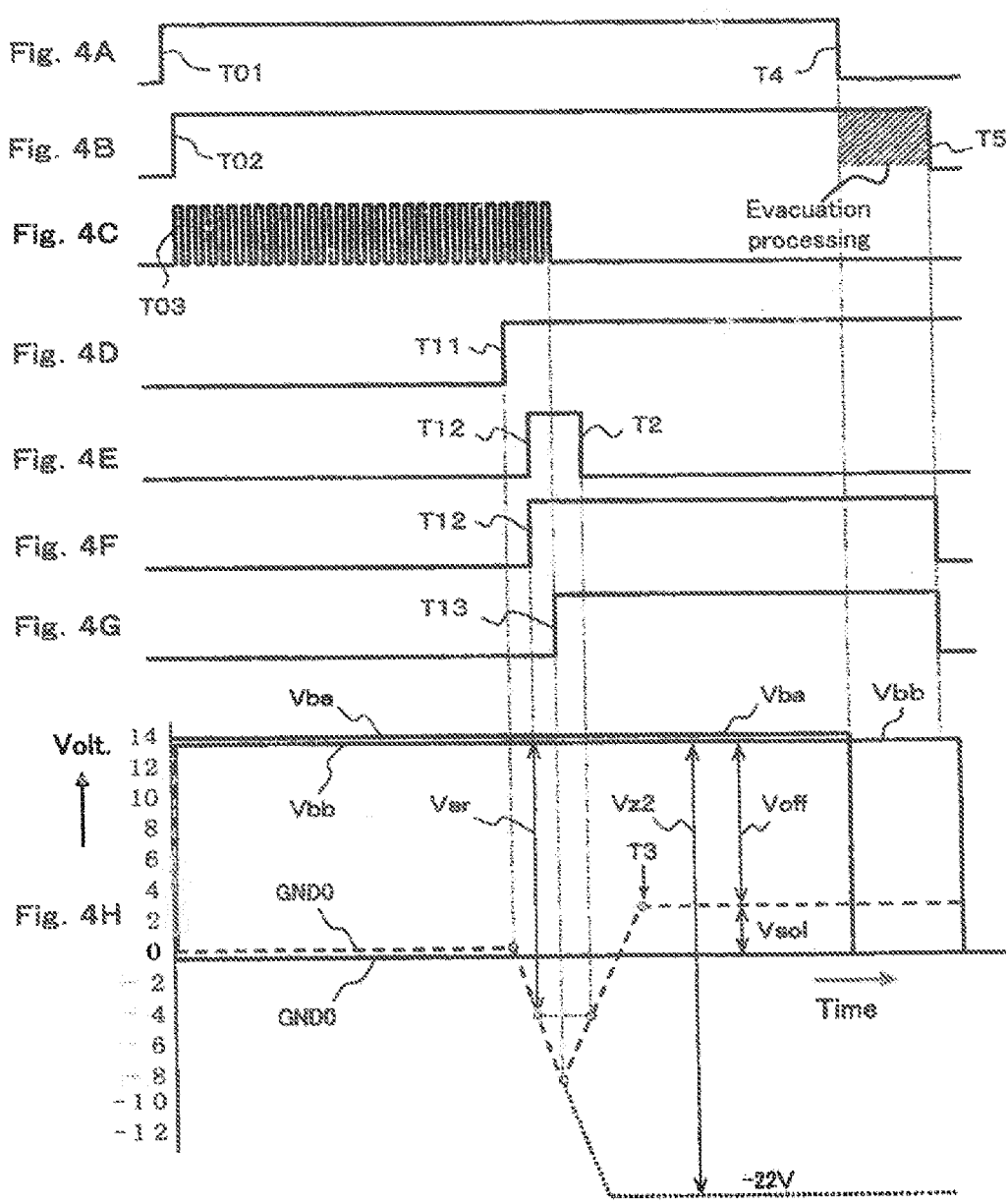
FIGS. 4A to 4H are each a timing chart for explaining the operation of the power supply control device for inductive loads in the first embodiment.

In addition, in FIG. 3, a charging generator 109a and a first voltage limiting diode 109b omitted in FIG. 1 are connected in parallel to the DC power supply 101. A first limiting voltage Vz1 by the first voltage limiting diode 109b is set to a larger value than the maximum charging voltage of the DC power supply 101 that is a vehicle battery. The value of a second limiting voltage Vz2 by the second voltage limiting diode 115 connected in parallel to the power capacitor 113 in the power supply control device 100A is set to a value that is a larger value than the first limiting voltage Vz1 and is a value less than the allowed withstand voltages of the power capacitor 113 and the constant voltage power supply 120.

In addition, a portion surrounded by the one-dot chain line in FIG. 3 indicates a power supply and a control circuit 110A.

In FIG. 3, at the start of the operation of the power supply control device 100A or while the power supply control device 100A is operating, the ground wiring line of the ground terminal 104 is disconnected in a state where the microprocessor 130A does not generate the driving command signals DR1a and DR1b for all inductive loads 108a and 108b. When the power switch 102a is closed or already closed, the output current of the DC power supply 101 is 200 mA, for example. A part of the output current is an excitation current to the excitation coil 102c, and most of the output current is a consumed current that flows from the constant voltage power supply 120 to the microprocessor 130A.

On the other hand, the load resistance of each of the inductive loads 108a and 108b is 6Ω, for example, and a voltage drop by the inductive loads 108a and 108b is 6×200/2=600 mV.

Accordingly, compared with the no-load current consumption of the power supply control device 100A, the rated current of the inductive loads 108a and 108b is sufficiently large. In this case, when the load resistance is small, even if the disconnection abnormality of the ground wiring line occurs, an almost full voltage of the main power supply voltage Vbb is applied to the power supply control device 100A. As a result, the microprocessor 130A itself can operate normally.

Thus, a state where the constant voltage power supply 120 and the inductive loads 108a and 108b are connected in series to each other and electric power is supplied from the DC power supply 101 is assumed to be a series power supply state hereinbelow.

In such a series power supply state, when the microprocessor 130A starts an intermittent power supply control for one of the inductive loads 108a and 108b, for example, when the power switching element 140a is closed, an excitation current flows from the DC power supply 101 to the inductive load 108a through the output contact point 102b of the power supply relay, the reverse flow blocking diode 112, the power switching element 140a, the current detection resistor 150a, the inductive load 108a, and the ground circuit GND0.

In this case, since the positive potential of the inductive load 108a rises but the positive potential on the side of the inductive load 108b is low, a sufficient power supply voltage is applied to the constant voltage power supply 120.

Here, when the power switching element 140a is opened, the excitation current that flowing through the inductive load 108a flows back in the path of the inductive load 108a, the ground circuit GND0, the DC power supply 101, the output contact point 102b of the power supply relay, the power capacitor 113, the commutation diode 152a, the current detection resistor 150a, and the inductive load 108a, and the power capacitor 113 is charged by the return current.

The power switching element 140a is intermittently controlled at periods of 2 msec, for example. When the intermittent operation is continued, the monitoring divided voltage by the voltage dividing resistors 124 and 125 exceeds a predetermined threshold value eventually, and the disconnection abnormality of the ground wiring line is detected by the microprocessor 130A.

As a result, the driving command signals DR1a and DR1b for all power switching elements 140a and 140b are stopped simultaneously, and the overcharging voltage of the power capacitor 113 is discharged to the constant voltage power supply 120, returning to the series power supply state described above.

However, once the disconnection abnormality of the ground wiring line is detected, the microprocessor 130A stores the disconnection of the ground wiring line. In this case, even if the voltage across the power capacitor 113 returns to the normal state, the driving command signals DR1a and DR1b for all power switching elements 140a and 140b continue to stop simultaneously. This opens the power switch 102a, and the memory information on the disconnection abnormality is reset when the power switch 102a is opened and re-closed.

If a complete conduction command of a duty ratio of 100% is given to all power switching elements 140a and 140b in the series power supply state described above, the positive potentials of the inductive loads 108a and 108b rise, and a change to the no-power-supply state is made in which the supply of electric power to the power capacitor 113 and the constant voltage power supply 120 is stopped.

When the no-power-supply state continues, the charging voltage of the power capacitor 113 is discharged to attenuate. Eventually, the microprocessor 130A cannot operate and the power switching elements 140a and 140b are opened. Accordingly, a change to the above-described series power supply state is made again, and such an unstable alternate operating state continues.

However, the low voltage cutoff element 149a is connected to the gate circuits of the power switching elements 140a and 140b. Accordingly, when the power switching elements 140a and 140b are opened before the microprocessor 130A becomes inoperative and returns to the series power supply state and this alternate operating state continues, the charging voltage of the power capacitor 113 rises due to the return current of the inductive loads 108a and 108b when the power switching elements 140a and 140b are opened, and the disconnection abnormality of the ground wiring line is detected eventually. As a result, the power switching elements 140a and 140b are opened simultaneously.

On the other hand, when the ground wiring line of the ground terminal 104 is normal and the vehicle battery, which is the DC power supply 101, is charged by the charging generator 109a, if terminal disconnection of the battery occurs, the charging generator 109a changes to a light load state suddenly. As a result, the output voltage rises, and a surge voltage is generated transiently by the response delay of the regulator in the charging generator 109a.

This surge voltage is absorbed by the first voltage limiting diode 109b. However, such a terminal disconnection abnormality can be detected by the microprocessor 130A by reducing the setting value of the determined threshold voltage and cannot be detected by increasing the setting value.

When terminal disconnection is detected by the microprocessor 130A, all power switching elements are opened simultaneously. However, when no terminal disconnection is detected, the control state of the power supply control device 100A can be maintained by the output voltage of the charging generator 109a.

Next, the operation will be described in detail with reference to FIGS. 4A to 4H showing the timing chart of the power supply control device in the first embodiment.

FIG. 4A shows the operating state of the power switch 102a, and shows being closed at time T01 and being opened at time T4.

FIG. 4B shows the operating state of the microprocessor 130A, and shows that the operation starts at time T02 and stops at time T5.

In addition, in a period of time T01 to time T02, the output contact point 102b of the power supply relay is closed, and the constant voltage power supply 120 generates the stabilization control voltage Vcc so that the initialization processing of the microprocessor 130A is performed. In a period of time T4 to time T5, the learning memory information or the abnormality occurrence information written in the RAM memory 133 is transmitted and stored in the nonvolatile data memory 132.

FIG. 4C shows a logic waveform of the driving command signal DR1a for the power switching element 140a, for example. The generation of the driving command signal DR1a starts at time T03 and stops at time T13, which will be described later.

FIG. 4D shows a disconnection state of the ground terminal 104, and shows that the ground terminal 104 is in a normal state until time T11 and the disconnection abnormality of the ground wiring line occurs after time T11.

FIG. 4E shows that the disconnection state of the ground wiring line is detected from time T12 to time T2, which will be described later. In this period, the value of the voltage monitoring signal ERA exceeds a predetermined threshold voltage.

FIG. 4F shows that the generation of the disconnection abnormality is stored in a period up to time T5 after the disconnection abnormality is detected at time T12.

FIG. 4G shows a state where all outputs are simultaneously stopped at time T13 in response to the detection of the disconnection abnormality at time T12 and accordingly, all power switching elements 140a and 140b are opened in a period of time T13 to time T5.

FIG. 4H shows a variation in the electric potential of each portion when the ground circuit GND0 is set as a reference potential "0".

First, when the power switch 102a is closed, the auxiliary power voltage Vba is generated in a period of time T01 to time T4.

In addition, when the output contact point 102b is closed, the main power supply voltage Vbb is generated in a period from immediately before time T02 to immediately after time T5.

The electric potential of the ground pattern GND1 in the power supply control device 100A is approximately equal to the reference potential "0" until time T11 at which the disconnection abnormality of the ground wiring line occurs.

However, after the occurrence of the disconnection abnormality, the charging voltage of the power capacitor 113 is increased by the return current from the inductive load 108a according to the intermittent operation of the power switching element 140a shown in FIG. 4C. As a result, if the output stop processing shown in FIG. 4G is not performed, the voltage across the power capacitor 113 increases up to, for example, DC 36 V that is the second limiting voltage Vz2 by the second voltage limiting diode 115, and the electric potential of the ground pattern GND1 when the main power supply voltage Vbb is 14 V is saturated at 14−36=−22 V.

In addition, the digital-converted value of a monitoring divided voltage obtained by dividing the value of a monitoring voltage Ver, which is a voltage across the power capacitor 113 at time T12, by the voltage dividing resistors 124 and 125 is equal to a predetermined digital threshold voltage.

When the intermittent driving of the power switching element 140a is stopped at time T13, charging by the return current from the inductive load 108a is stopped, and discharging to the constant voltage power supply 120 is performed and the voltage across the power capacitor 113 is gradually decreased. Eventually, at time T2 when the voltage across the power capacitor 113 becomes equal to or lower than the predetermined monitoring voltage Ver, the disconnection detection shown in FIG. 4E is released. Accordingly, a change to the above-described series power supply state is made at time T3.

As a result, a series power supply voltage Voff is applied to the power capacitor 113 or the constant voltage power supply 120, and a residual voltage Vsol calculated as a value of the parallel combined resistance of the consumed current at that time and the inductive loads 108a and 108b is applied to the inductive loads 108a and 108b.

In addition, if the value of the monitoring voltage Ver is set to a value less than the first limiting voltage Vz1 by the first voltage limiting diode 109b connected in parallel to the charging generator 109a, it is possible to detect terminal disconnection of a battery. However, if the value of the monitoring voltage Ver is set to a value exceeding the first limiting voltage Vz1, terminal disconnection is not detected by the power supply control device 100A. Therefore, power switching elements are not inadvertently opened simultaneously.

Figure 5:
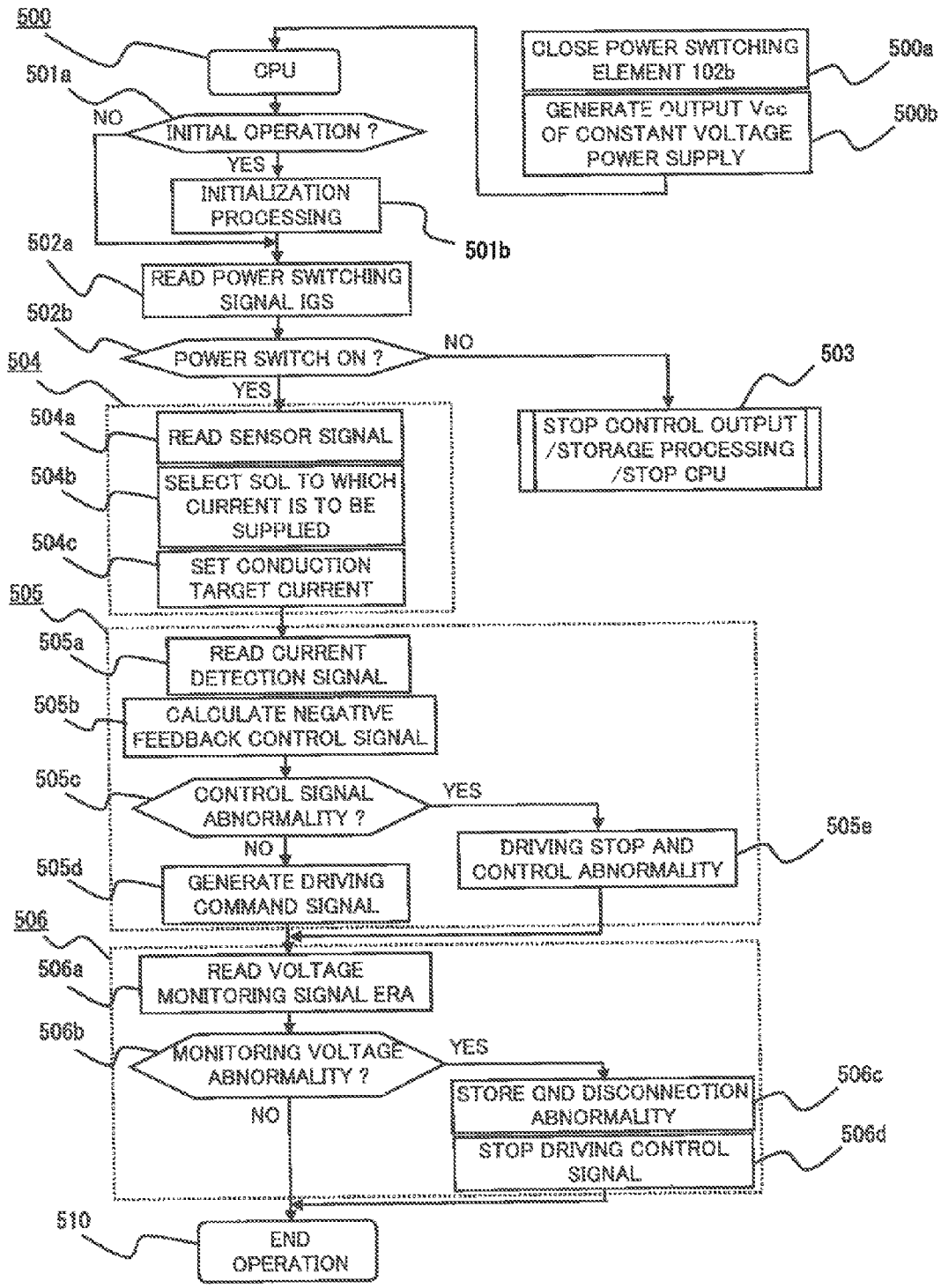
FIG. 5 is a flow chart for explaining the operation of the power supply control device for inductive loads in the first embodiment.

Next, the operation of the power supply control device in the first embodiment will be described in detail with reference to FIG. 5 showing the flow chart.

In FIG. 5, in step 500a, the power switch 102a is closed, and the output contact point 102b of the power supply relay used as a power switching element is closed. Then, in step 500b, the main power supply voltage Vbb is applied to the constant voltage power supply 120, and the predetermined stabilization control voltage Vcc is generated.

Then, in step 500, power-on reset processing on the microprocessor 130A is performed and then the microprocessor 130A starts a control operation.

Then, in step 501a, it is determined whether or not a flag (not shown) is set, that is, whether or not the execution of step 501a is the first time. If the execution of step 501a is a first operation (YES), the process proceeds to step 501b to set the flag (not shown). If the execution of step 501a is not the first operation (NO), the process proceeds to step 502a.

In step 501b, predetermined initialization processing is performed. Then, the process proceeds to step 502a.

In step 502a, the logic level of the power switching signal IGS is read. Then, the process proceeds to step 502b.

In step 502b, according to the logic level of the power switching signal IGS read in step 502a, if the power switch 102a is closed (YES), the process proceeds to step 504a. If the power switch 102a is opened (NO), the process proceeds to step 503.

In step 503, the microprocessor 130A stops the generation of the control output, and also stops the control operation after transmitting and storing the learning memory information or the abnormality occurrence information stored in the RAM memory 133 into the nonvolatile data memory 132. As a result, the self-holding command signal DR0 is released to de-energize the excitation coil 102c of the power supply relay, thereby opening the output contact point 102b that is a power switching element.

In step 504a executed when the power switch 102a is closed, the operating state of the input sensor group 106 is read, and the process proceeds to step 504b. In step 504b, a load to which a current is to be supplied, of the plurality of inductive loads 108a and 108b, is selected and determined, and the process proceeds to step 504c. In step 504c, a conduction target current, which corresponds to the selected and determined inductive loads 108a and 108b, is set, and the process proceeds to step 505a.

By the above-described steps 504a to 504c, target current setting means 504 is formed.

Then, in step 505a, the current detection signals Vca and Vcb that are output signals of the differential amplifiers 151a and 151b are read, and the process proceeds to step 505b. In step 505b, a negative feedback control signal voltage that is an algebraic sum of a deviation proportional voltage, which is proportional to the deviation value between the value of the conduction target current set in step 504c and the value of the detected excitation current read in step 505a, and a deviation integration voltage, which is proportional to the time integral value of the deviation value, is calculated, and the process proceeds to step 505c.

In step 505c, it is determined whether or not the value of the negative feedback control signal voltage calculated in step 505b exceeds a predetermined allowed deviation voltage. If the value of the negative feedback control signal voltage calculated in step 505b does not exceed the predetermined allowed deviation voltage (NO), the process proceeds to step 505d. If the value of the negative feedback control signal voltage calculated in step 505b exceeds the predetermined allowed deviation voltage (YES), the process proceeds to step 505e.

In step 505d, the duty ratio of the power switching elements 140a and 140b to be controlled is increased or decreased by the negative feedback control signal voltage calculated in step 505b. In step 505e, the duty ratio of the power switching elements 140a and 140b to be controlled is set to zero (driving is stopped), the occurrence of the control abnormality is stored.

That is, this step 505e is control abnormality processing means. In addition, negative feedback control means 505 is formed by the above-described steps 505a to 505e.

Then, in step 506a, the voltage monitoring signal ERA generated by the voltage dividing resistors 124 and 125 is read. Then, the process proceeds to step 506b. In step 506b, it is determined whether or not the digital conversion value of the voltage monitoring signal ERA read in step 506a exceeds a predetermined digital threshold voltage Vsd. If the digital conversion value of the voltage monitoring signal ERA read in step 506a does not exceed the predetermined digital threshold voltage Vsd (NO), the process proceeds to operation end step 510. If the digital conversion value of the voltage monitoring signal ERA read in step 506a exceeds the predetermined digital threshold voltage Vsd (YES), the process proceeds to step 506c.

In step 506c, the occurrence of the disconnection abnormality of the ground wiring line is stored. Then, the process proceeds to step 506d. In step 506d, the driving command signals DR1a and DR1b for all power switching elements 140a and 140b are stopped simultaneously. Then, the process proceeds to operation end step 510.

Disconnection abnormality determination means 506 is formed by the above-described steps 506a to 506d.

Then, the microprocessor 130A returns to operation start step 500 after executing other control programs, and repeatedly executes a series of control flow of steps 500 to 510.

As described above, the power supply control device for inductive loads according to the first embodiment includes: a plurality of power switching elements 140a and 140b that are provided between a DC power supply 101 having a negative terminal connected to a ground circuit GND0 and a plurality of inductive loads 108a and 108b and that are connected between a positive terminal of the DC power supply 101 and a positive terminal of each of the plurality of inductive loads 108a and 108b so as to be intermittently driven; and a microprocessor 130A that performs switching control of at least the plurality of power switching elements 140a and 140b. Electric power is supplied from the DC power supply 101 to the power supply control device 100A for inductive loads through a power supply terminal 103b and a ground terminal 104. A constant voltage power supply 120 that supplies a predetermined stabilization control voltage Vcc to the microprocessor 130A, a power capacitor 113, and voltage dividing resistors 124 and 125 are connected in parallel to each other between the power supply terminal 103b and the ground terminal 104. Commutation diodes 152a and 152b are connected between output ends of the plurality of power switching elements 140a and 140b and the ground terminal 104. In a state where one of the plurality of power switching elements 140a and 140b is closed and an excitation current flows through one of the plurality of inductive loads 108a and 108b, when the closed power switching elements 140a and 140b are opened, the commutation diodes 152a and 152b are connected in a relationship in which the excitation current is commutated and attenuates through the ground terminal 104 and the commutation diodes 152a and 152b. When a disconnection abnormality of a ground wiring line between the ground terminal 104 and the ground circuit GND0 occurs, the excitation current flowing through one of the plurality of inductive loads 108a and 108b flows back and attenuates through the DC power supply 101, the power capacitor 113, and the commutation diodes 152a and 152b, and the power capacitor 113 is charged by the return current. When a monitoring voltage Ver that is a voltage across the power capacitor 113 rises and a monitoring divided voltage divided by the voltage dividing resistors 124 and 125 exceeds a predetermined threshold voltage, occurrence of a disconnection abnormality of the ground wiring line between the ground terminal 104 and the ground circuit GND0 is detected and stored, and driving command signals DR1a and DR1b for the plurality of power switching elements 140a and 140b are simultaneously stopped according to the detection and storage of the disconnection abnormality.

That is, the plurality of power switching elements connected between the DC power supply and the upstream positions of the plurality of inductive loads and the commutation diode connected in parallel to each of the inductive loads are provided, and the power capacitor is connected between the power supply terminal and the ground terminal of the power supply control device. Focusing on the fact that the voltage across the power capacitor abnormally rises due to the flow of the excitation current of each inductive load to the power capacitor when the wiring line between the ground circuit of the DC power supply and the inductive loads and the ground terminal of the power supply control device is disconnected, the disconnection abnormality of the ground wiring line is detected.

Therefore, in a state where the ground circuit between the DC power supply and each inductive load is formed by omitting direct wiring between the negative terminals of the power supply control device and each inductive load to suppress the wiring cost, the malfunction of the power supply control device can be prevented by detecting an abnormal state in which only the ground terminal of the power supply control device is opened.

In addition, the monitoring divided voltage is input to the microprocessor 130A as a voltage monitoring signal ERA through a multi-channel A/D converter 134. A program memory 131 cooperating with the microprocessor 130A includes a control program as disconnection abnormality determination means 506. When a digital conversion value of the voltage monitoring signal ERA exceeds a predetermined digital threshold voltage Vsd, the disconnection abnormality determination means 506 stores abnormality occurrence information due to the occurrence of the disconnection abnormality of the ground wiring line and stops the driving command signals DR1a and DR1b for the plurality of power switching elements 140a and 140b simultaneously. The stored abnormality occurrence information is erased by a power-on reset circuit for the microprocessor 130A or initialization means 501b that is a control program executed at the start of an operation when electric power is supplied to the microprocessor 130A.

That is, the monitoring divided voltage by the voltage dividing resistors is input to the microprocessor through the multi-channel A/D converter, and the storage and initialization processing of abnormality occurrence information caused by the occurrence of the disconnection abnormality of the ground wiring line are executed by the microprocessor.

Therefore, even if the monitoring voltage returns to the normal state due to the stopping of the driving of the power switching element according to the occurrence of the abnormality in the monitoring voltage, the supply of electric power is not started again once the power supply is turned off. As a result, it is possible to obtain a low-cost power supply control device with a simple hardware configuration.

In addition, current detection resistors 150a and 150b are connected in series to upstream positions of the plurality of inductive loads 108a and 108b. Output voltages of differential amplifiers 151a and 151b that generate current detection signals Vca and Vcb proportional to voltages across the current detection resistors 150a and 150b are input to the microprocessor 130A through the multi-channel A/D converter 134. A program memory 131 cooperating with the microprocessor 130A includes a control program as target current setting means 504 and negative feedback control means 505. The target current setting means 504 sets a value of a conduction target current for each of the plurality of inductive loads 108a and 108b according to an operating state of an input sensor group 106 input to the microprocessor 130A.

In addition, the negative feedback control means 505 calculates a deviation value between the value of the conduction target current set by the target current setting means 504 and values of the current detection signals Vca and Vcb and generates a negative feedback control signal by performing algebraic addition of at least the deviation value and a value proportional to an integral value of the deviation value, and determines whether or not a value of the negative feedback control signal is a value in a predetermined range. When the value of the negative feedback control signal is in the predetermined range, power switching elements 140a and 140b for the selected inductive loads 108a and 108b of the plurality of inductive loads 108a and 108b are intermittently driven by generating the driving command signals DR1a and DR1b based on a current duty proportional to the value of the negative feedback control signal. Control abnormality processing means 505e for storing occurrence of a control abnormality and stopping conduction driving of the power switching elements 140a and 140b for the selected inductive loads 108a and 108b when the value of the negative feedback control signal is outside the predetermined range is included in the negative feedback control means 505.

That is, a supply current for the inductive load is detected by the current detection resistor, and is input to the microprocessor through the multi-channel A/D converter. The microprocessor sets a conduction target current according to the operating state of the input sensor group, controls the intermittent duty ratio of the power switching element according to the deviation value between the conduction target current and the detection current and stores the abnormality occurrence state when the deviation value is abnormal, and stops the conduction driving of the power switching element.

Therefore, since a hardware burden for the negative feedback control is reduced, a low-cost power supply control device is obtained. In addition, it is possible to detect disconnection abnormalities of the positive-side wiring line of any of the plurality of inductive loads, short-circuit abnormalities due to being short-circuited to the power supply line, ground abnormalities due to being short-circuited to the ground circuit, disconnection and short-circuit abnormalities of the power switching element, and disconnection and short-circuit abnormalities of the inductive load itself.

In addition, when the ground terminal of the power supply control device is disconnected in a state where all power switching elements are opened, an excessive voltage equal to or higher than the power supply voltage of the DC power supply is not generated in the voltage dividing resistor. Accordingly, it is not possible to detect the disconnection abnormality. However, when the occurrence of the control abnormality is detected due to a small current flowing to each inductive load from the constant voltage power supply even though the conduction target current is zero and all of the plurality of inductive loads are in the abnormal control state, it can be determined that the ground terminal is disconnected.

In addition, the DC power supply 101 is a vehicle battery charged by a charging generator 109a. A first voltage limiting diode 109b having a first limiting voltage Vz1 of a larger value than a maximum charging voltage of the vehicle battery is connected in parallel to the charging generator 109a. A second voltage limiting diode 115 having a second limiting voltage Vz2, which is a larger value than the first limiting voltage Vz1 by the first voltage limiting diode 109b, is connected in parallel to the power capacitor 113. The second limiting voltage Vz2 is a value less than allowed withstand voltages of the power capacitor 113 and the constant voltage power supply 120. A threshold monitoring voltage, which is a voltage across the power capacitor 113 when the monitoring divided voltage becomes equal to the threshold voltage, is a value exceeding a maximum charging voltage of the DC power supply 101, and is a value less than the first limiting voltage Vz1.

That is, the second limiting voltage by the second voltage limiting diode connected in parallel to the power capacitor is set to be larger than the first limiting voltage by the first voltage limiting diode provided in the charging generator of the DC power supply that is a vehicle battery, and the voltage across the power capacitor when determining the disconnection abnormality of the ground wiring line is a value exceeding the maximum charging voltage of the vehicle battery, and is set to a value less than the first limiting voltage.

Accordingly, a transient high-voltage power energy when the output voltage of the charging generator increases rapidly transitionally since the power supply terminal of the vehicle battery is disconnected and the load current of the charging generator decreases rapidly in a normal state, in which the ground wiring line of the power supply control device is not disconnected, and accordingly the control response is delayed is absorbed by the first voltage limiting diode. Therefore, since no burden is applied to the second voltage limiting diode, there is an effect that a small diode having a small capacity can be used as the second voltage limiting diode.

In addition, there is an effect that, when there is terminal disconnection of the vehicle battery or when the disconnection abnormality of the ground wiring line of the power supply control device occurs even if the connection of the power supply terminal of the vehicle battery is normal, the occurrence of the abnormality can be quickly detected by the voltage across the power capacitor exceeding the maximum charging voltage.

In addition, the DC power supply 101 is a vehicle battery charged by a charging generator 109a. A first voltage limiting diode 109b having a first limiting voltage Vz1 of a larger value than a maximum charging voltage of the vehicle battery is connected in parallel to the charging generator 109a. A second voltage limiting diode 115 having a second limiting voltage Vz2, which is a larger value than the first limiting voltage Vz1 by the first voltage limiting diode 109b, is connected in parallel to the power capacitor 113. The second limiting voltage Vz2 is a value less than allowed withstand voltages of the power capacitor 113 and the constant voltage power supply 120. A threshold monitoring voltage, which is a voltage across the power capacitor 113 when the monitoring divided voltage becomes equal to the threshold voltage, is a value exceeding the first limiting voltage Vz1, and is a value less than the second limiting voltage Vz2.

That is, the second limiting voltage by the second voltage limiting diode connected in parallel to the power capacitor is set to be larger than the first limiting voltage by the first voltage limiting diode provided in the charging generator of the DC power supply that is a vehicle battery, and the voltage across the power capacitor when determining the disconnection abnormality of the ground wiring line is a value exceeding the first limiting voltage, and is set to a value less than the second limiting voltage.

Accordingly, a transient high-voltage power energy when the output voltage of the charging generator increases rapidly transitionally since the power supply terminal of the vehicle battery is disconnected and the load current of the charging generator decreases rapidly in a normal state, in which the ground wiring line of the power supply control device is not disconnected, and accordingly the control response is delayed is absorbed by the first voltage limiting diode. Therefore, since no burden is applied to the second voltage limiting diode, there is an effect that a small diode having a small capacity can be used as the second voltage limiting diode.

In addition, when there is terminal disconnection of the vehicle battery, the terminal disconnection is not detected by the power supply control device. Accordingly, since the power switching elements are not cut off simultaneously, there is an effect that the switching control of each power switching element can be continued.

In addition, when there is terminal disconnection of the vehicle battery, duplicate detection by the power supply control device is performed to detect terminal disconnection abnormalities in an external device, such as a charging generator, a power supply relay box, or a fuse box. As a result, it is possible to prevent each control device from performing separate corresponding processing inadvertently.

Second Embodiment

Figure 6:
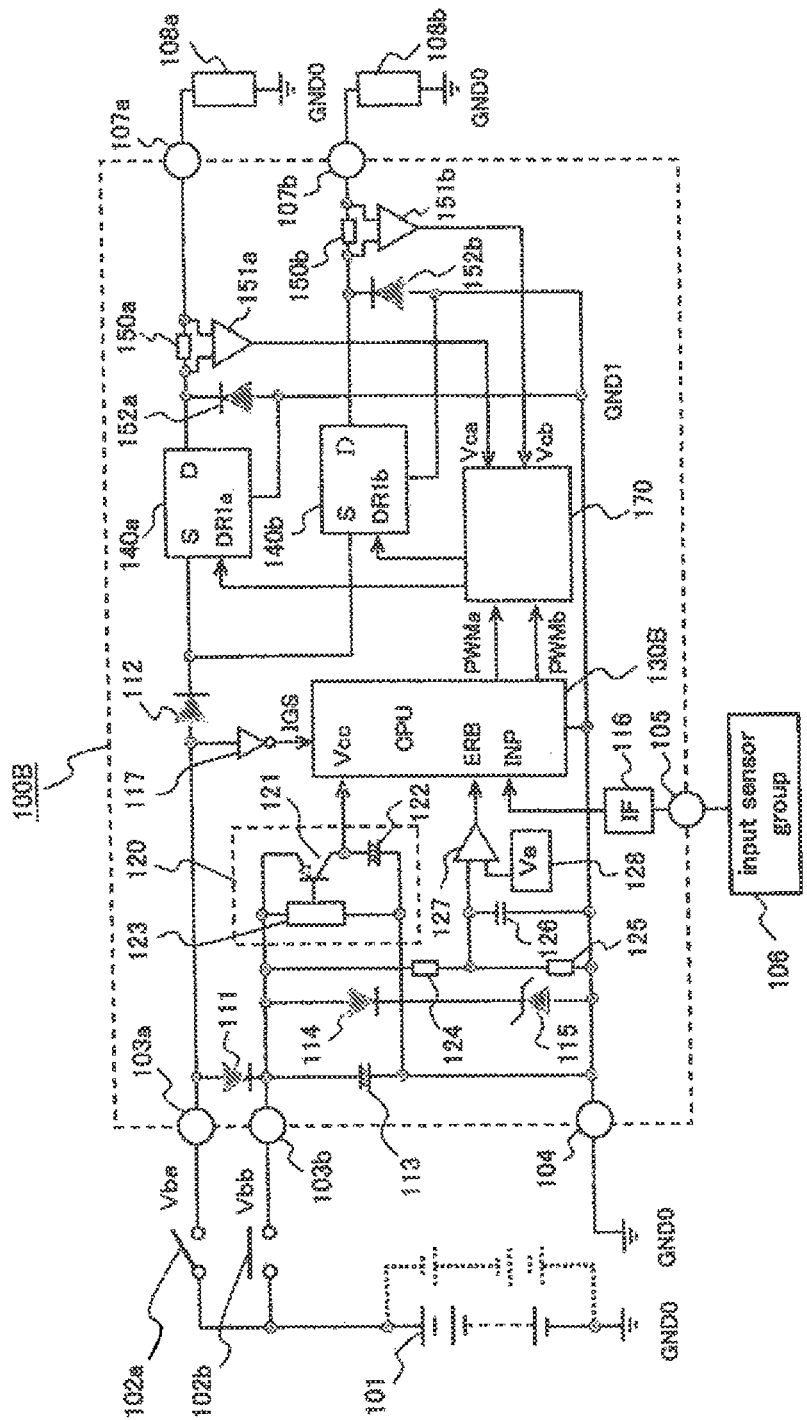
FIG. 6 is an overall circuit diagram showing a power supply control device for inductive loads according to a second embodiment of the present invention.
Figure 7:
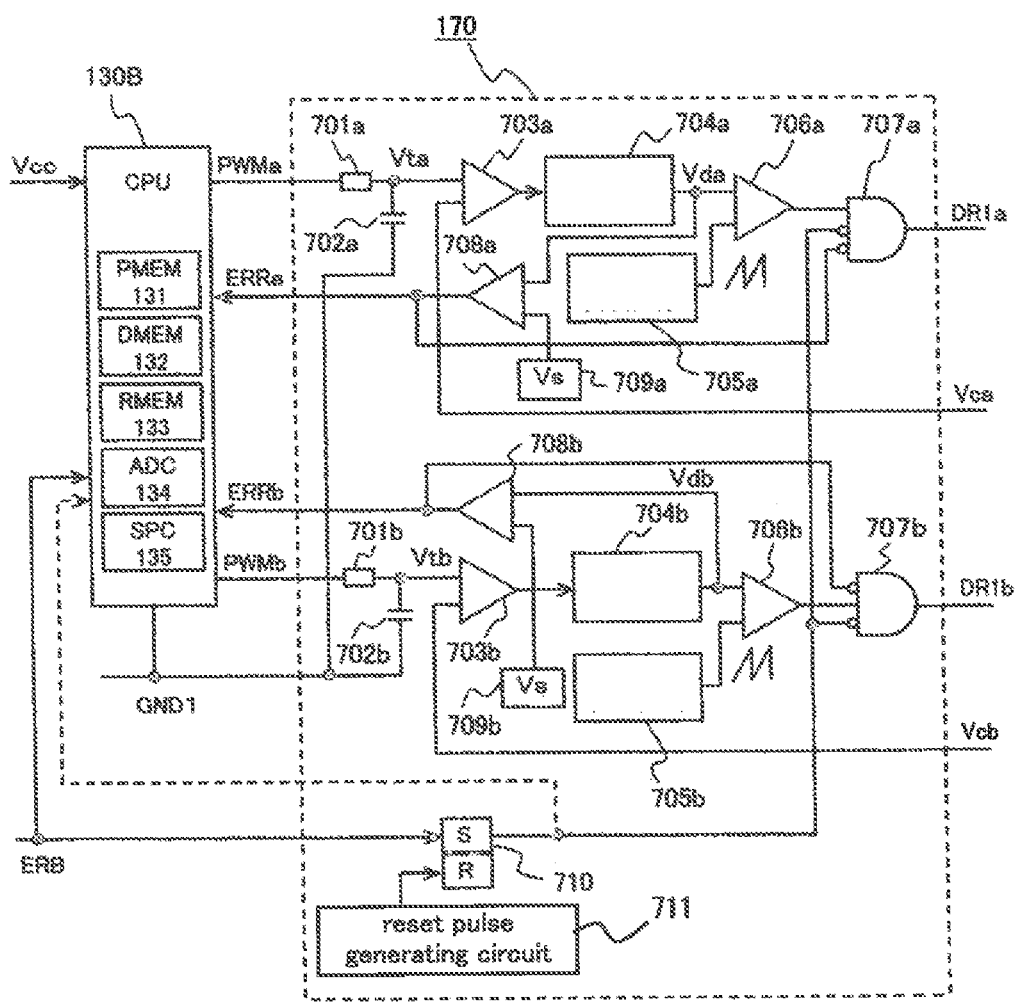
FIG. 7 is a block diagram showing the details of the main part in FIG. 6.

FIGS. 6 and 7 are circuit diagrams showing the entire power supply control device for inductive loads and the details of a main part according to a second embodiment. In addition, in FIGS. 6 and 7, the same reference numerals are given to the same portions as in FIGS. 1 and 2 showing the first embodiment and explanation thereof will be omitted, and the following explanation will be focused on the differences.

In FIG. 6, a power supply control device 100B for inductive loads (hereinafter, simply referred to as a power supply control device) is configured to include a constant voltage power supply 120, a microprocessor 130B, and a plurality of power switching elements 140*a* and 140*b* as main components as in FIG. 1, but a negative feedback control circuit 170 is added as a first difference compared with FIG. 1.

In addition, as a second difference, a divided monitoring voltage by the voltage dividing resistors 124 and 125 is input to a comparator 127, is compared with a comparison reference voltage 128 that is an analog threshold voltage Vsa, and is input to the microprocessor 130B as a voltage abnormality determination signal ERB.

The microprocessor 130B sets a conduction target current, generates target current setting signals PWMa and PWMb that are pulse train signals of a duty proportional to the value of the set conduction target current, and inputs the target current setting signals PWMa and PWMb to the negative feedback control circuit 170. The negative feedback control circuit 170 compares the conduction target current with the detection value of the excitation current by the current detection signals Vca and Vcb and generates driving command signals DR1*a* and DR1*b* for the power switching elements 140*a* and 140*b*, as will be described later with reference to FIG. 7.

The power switch 102*a* and the output contact point 102*b* of a power supply relay, which is a power switching element, are connected to the outside of the power supply control device 100B as in the case of FIG. 1. The auxiliary power voltage Vba and the main power supply voltage Vbb are supplied from the DC power supply 101, and excitation currents of the plurality of inductive loads 108*a* and 108*b* are controlled according to the operating state of the input sensor group 106 and the content of a control program stored in the program memory 131 cooperating with the microprocessor 130B.

In addition, biasing control of the power supply relay having the output contact point 102*b* is performed from the outside of the power supply control device 100B, and electric power is supplied from the power switch 102*a* to the constant voltage power supply 120 through a power diode 111 in a delay period until the output contact point 102*b* is closed after the power switch 102*a* is closed.

In addition, the excitation current for the inductive loads 108*a* and 108*b* is supplied through the power switch 102*a*, and the excitation current is cut off immediately after the power switch 102*a* is opened, but the constant voltage power supply 120 receives electric power continuously through the output contact point 102*b*. Accordingly, power failure recovery processing of the microprocessor 130B is performed during this period.

FIG. 7 is a block diagram showing the details of the negative feedback control circuit 170 shown in FIG. 6.

In FIG. 7, a target current setting signal PWMa that is a pulse train signal generated by the microprocessor 130B is smoothed by a smoothing resistor 701*a* and a smoothing capacitor 702*a* that form a smoothing circuit, and an analog target voltage Vta proportional to the value of the conduction target current is generated.

A preceding comparison circuit 703*a* generates a deviation voltage between the analog target voltage Vta and the detection signal voltage proportional to the current detection signal Vca, and inputs the deviation voltage to a deviation signal generating circuit 704*a*.

The deviation signal generating circuit 704*a* generates a negative feedback control voltage Vda that is an algebraic sum of a deviation proportional voltage proportional to the deviation voltage and a deviation integration voltage proportional to the time integral value of the deviation voltage.

A comparison circuit for duty ratio control 706*a* compares a sawtooth voltage having a predetermined period, which is generated by a sawtooth wave signal generating circuit 705*a*, with the negative feedback control voltage Vda, generates a logic signal with a logic level "H" when the negative feedback control voltage Vda is large, and performs driving for closing the power switching element 140*a* using the driving command signal DR1*a* through a gate circuit 707*a*.

When the negative feedback control voltage Vda exceeds an abnormality determination reference voltage 709*a*, an abnormality determination comparison circuit 708*a* generates a control abnormality detection signal ERRa and inputs the control abnormality detection signal ERRa to the microprocessor 130B. This acts on the gate circuit 707*a* to stop the generation of the driving command signal DR1*a*.

A series of control circuits relevant to the driving command signal DR1*b*, the analog target voltage Vtb, and the negative feedback control voltage Vdb on the side of the inductive load 108*b* are formed similarly.

A voltage abnormality storage circuit 710 formed by a flip-flop circuit is set by the voltage abnormality determination signal ERB generated by the comparator 127 in FIG. 6, and the set output signal acts on the gate circuit 707*a* and the gate circuit 707*b* to stop the driving command signals DR1*a* and DR1*b* simultaneously.

A reset pulse generating circuit 711 generates a reset pulse signal when the supply of electric power to the power supply control device 100B starts, thereby power-on resetting the memory information of the voltage abnormality storage circuit 710.

In addition, an abnormality occurrence memory signal by the voltage abnormality storage circuit 710 may be input instead of the voltage abnormality determination signal ERB generated by the comparator 127 being input to the microprocessor 130B as it is.

Next, for the power supply control device 100B shown in FIG. 6, differences between FIG. 8, which is a power supply circuit diagram in a negative line disconnection state, and FIG. 3 will be described.

Figure 8:
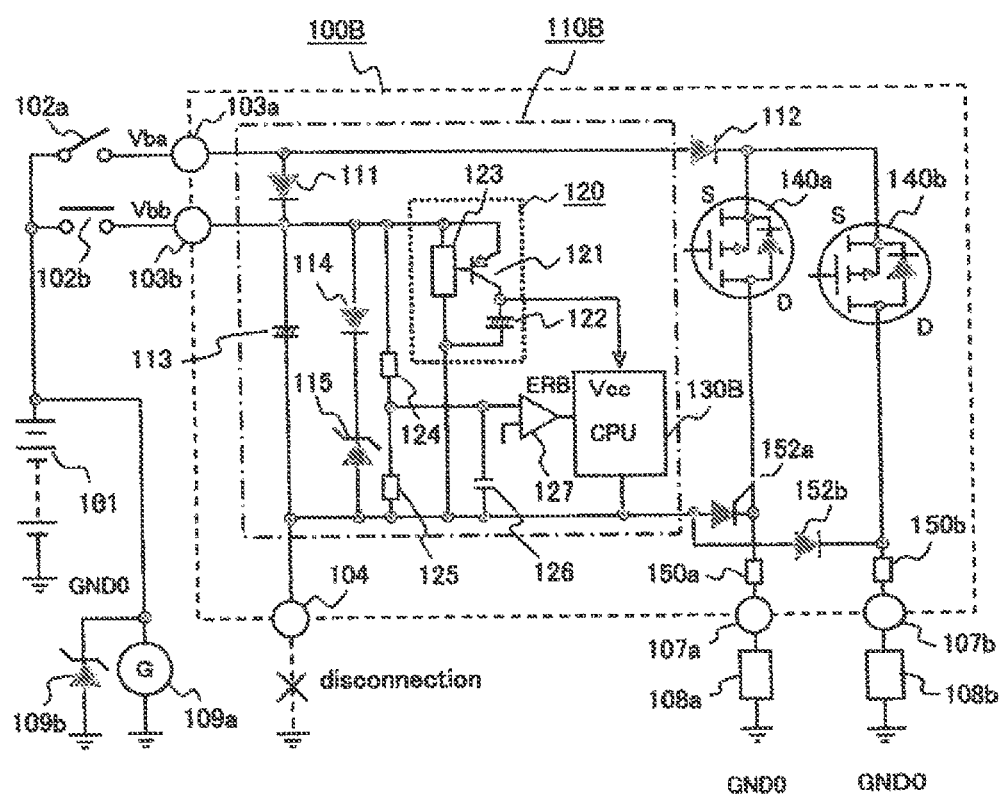
FIG. 8 is a circuit diagram for explaining the negative line disconnection state in the second embodiment.

In addition, in FIGS. 6 and 8, the power switching elements 140*a* and 140*b* are formed as in FIG. 2. Therefore, when the power switch 102*a* is closed, electric power is supplied to the power switching elements 140*a* and 140*b* from the power switch 102*a* instead of the output contact point 102*b* shown in FIG. 3, and electric power is supplied to the constant voltage power supply 120 through the power switch 102*a* and the power diode 111. The operating state of the power supply control device 100B when the ground terminal 104 is disconnected is the same as that shown in the timing chart of FIG. 4.

In addition, a portion surrounded by the one-dot chain line shows a power supply and a control circuit 110B.

Next, the operation of the power supply control device for inductive loads according to the second embodiment will be described in detail.

First, in FIGS. 6 and 7, the operation of the power supply control device 100B when everything is in a normal state will be described.

At the start of operation, the power switch 102*a* is closed first. Then, the auxiliary power voltage Vba is applied from the DC power supply 101 to the power supply control device 100B through the power diode 111. Then, when the output contact point 102*b* of the power supply relay is closed, the main power supply voltage Vbb is applied from the DC power supply 101 to the power supply control device 100B.

The constant voltage power supply 120 operates with the main power supply voltage Vbb changing in a range of, for example, DC 10 V to 16 V or a voltage, which is obtained after subtracting a voltage drop by the power diode 111 from the voltage, as an input voltage, generates the stabilization control voltage Vcc of, for example, DC 5 V, and supplies the electric power to the microprocessor 130B.

As a result, the microprocessor 130B starts a control operation after performing initialization processing. When the power switch 102a is started eventually, this situation is detected by the power switching signal IGS, and the microprocessor 130B transmits and stores the learning memory information or the abnormality occurrence information written in the RAM memory 133 in the nonvolatile data memory 132.

Then, the microprocessor 130B stops the control operation after notifying an external device of the completion of the storage of the memory information through the serial-to-parallel converter 135.

While the power switch 102a is closed, the microprocessor 130B performs driving control of the inductive loads 108a and 108b and a group of other electrical loads (not shown) according to the operating state of the input sensor group 106 and the content of an input/output control program stored in the program memory 131.

In addition, the microprocessor 130B determines a load to which a current is to be supplied of the plurality of inductive loads 108a and 108b, sets a conduction target current for the determined inductive loads 108a and 108b, and generates the target current setting signals PWMa and PWMb that are pulse train signals of the duty proportional to the value of the conduction target current.

The negative feedback control circuit 170 generates the negative feedback control voltages Vda and Vdb according to deviation voltages between the analog target voltages Vta and Vtb, which are obtained by smoothing the target current setting signals PWMa and PWMb, and the detection voltages of the current detection signals Vca and Vcb, and generates the driving command signals DR1a and DR1b so that the value of the excitation current detected by the current detection resistors 150a and 150b matches the value of the conduction target current. In this manner, the duty ratio (ratio between the ON time and the switching period) of the power switching elements 140a and 140b is increased or decreased to perform negative feedback control.

Next, the operation of the power supply control device 100B shown in FIG. 6 will be described with reference to the flow chart shown in FIG. 9. Since FIG. 9 corresponds to FIG. 5 described in the first embodiment, the following explanation will be focused on the differences from FIG. 5.

Figure 9:
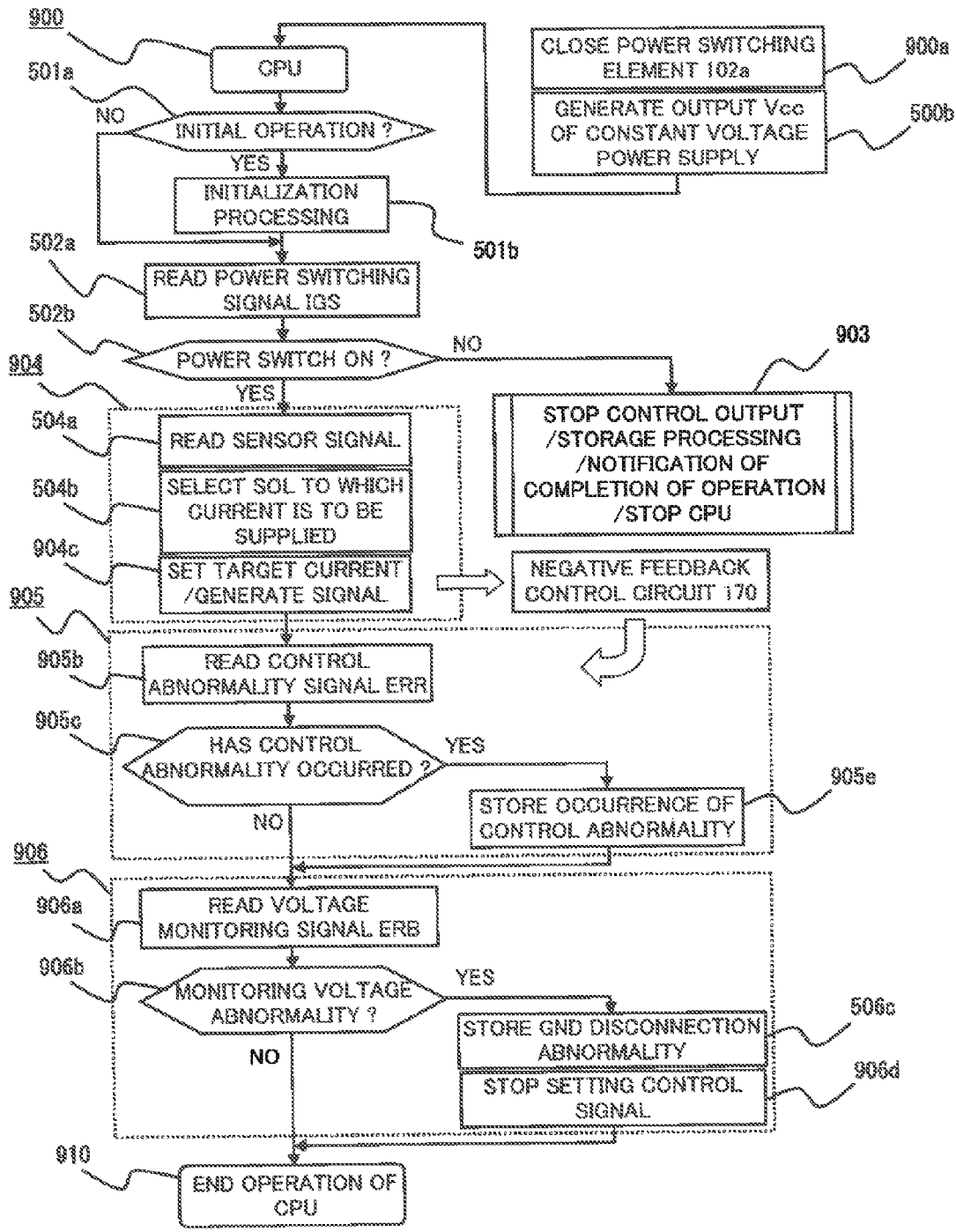
FIG. 9 is a flow chart for explaining the negative line disconnection state in the second embodiment.

In FIG. 9, in step 900a, the power switch 102a is closed, and the auxiliary power voltage Vba is applied to the constant voltage power supply 120. Then, in step 500b, the constant voltage power supply 120 generates the predetermined stabilization control voltage Vcc.

Then, in step 900, power-on reset processing on the microprocessor 130B is performed and then the microprocessor 130B starts a control operation.

Then, in step 501a, it is determined whether or not a flag (not shown) is set, that is, whether or not the execution of step 501a is the first time. If the execution of step 501a is a first operation (YES), the process proceeds to step 501b to set the flag (not shown). If the execution of step 501a is not the first operation (NO), the process proceeds to step 502a.

That is, step 501b forms initialization means 501b. After performing the predetermined initialization processing, the process proceeds to step 502a.

In step 502a, the logic level of the power switching signal IGS is read. Then, the process proceeds to step 502b.

In step 502b, according to the logic level of the power switching signal IGS read in step 502a, if the power switch 102a is closed (YES), and the process proceeds to step 504a. If the power switch 102a is opened (NO), the process proceeds to step 903.

In step 903, the microprocessor 130B stops the generation of the control output, and also sends a notification of the completion of the operation through the serial-to-parallel converter 135 after transmitting and storing the learning memory information or the abnormality occurrence information stored in the RAM memory 133 into the nonvolatile data memory 132. Then, the microprocessor 130B stops all control operations when a predetermined time has passed or received a confirmation reply.

In step 504a, the operating state of the input sensor group 106 is read, and the process proceeds to step 504b. In step 504b, a load to which a current is to be supplied, of the plurality of inductive loads 108a and 108b, is selected and determined, and the process proceeds to step 904c. In step 904c, a conduction target current corresponding to the selected and determined inductive loads 108a and 108b is set, and the target current setting signals PWMa and PWMb are supplied to the negative feedback control circuit 170. Then, the process proceeds to step 905b.

By the above-described steps 504a to 904c, target current setting means 904 is formed.

In step 905b subsequent to step 904c, the control abnormality detection signals ERRa and ERRb generated by the negative feedback control circuit 170 are read, and the process proceeds to 905c. In step 905c, it is determined whether or not the control abnormality has occurred according to the reading result of the control abnormality detection signals ERRa and ERRb in step 905b. If it is determined that the control abnormality has occurred (YES), the process proceeds to step 905e. If it is determined that the control abnormality has not occurred (NO), the process proceeds to step 906a. In step 905e, the duty ratio of the power switching elements 140a and 140b to be controlled is set to 0, and the occurrence of the control abnormality is stored. Then, the process proceeds to step 906a.

By the above-described steps 905b to 905e, control abnormality processing means 905 is formed.

In step 906a, the voltage abnormality determination signal ERB by the comparator 127 is read, and the process proceeds to step 906b. In step 906b, it is determined whether or not the divided monitoring voltage by the voltage dividing resistors 124 and 125 exceeds the predetermined analog threshold voltage Vsa according to the logic level of the voltage abnormality determination signal ERB read in step 906a. If the divided monitoring voltage by the voltage dividing resistors 124 and 125 does not exceed the predetermined analog threshold voltage Vsa (NO), the process proceeds to operation end step 910. If the divided monitoring voltage by the voltage dividing resistors 124 and 125 exceeds the predetermined analog threshold voltage Vsa (YES), the process proceeds to step 506c. In step 506c, the occurrence of the disconnection abnormality of the ground wiring line is stored. Then, the process proceeds to step 906d. In step 906d, the target current setting signals PWMa and PWMb for all power switching elements 140a and 140b are stopped simultaneously. Then, the process proceeds to operation end step 910.

By the above-described steps 906a to 906d (including step 506c), disconnection abnormality processing means 906 is formed.

Then, in operation end step 910, the microprocessor 130B returns to operation start step 900 after executing other control programs, and repeatedly executes a series of control flow of steps 900 to 910.

Figure 10:
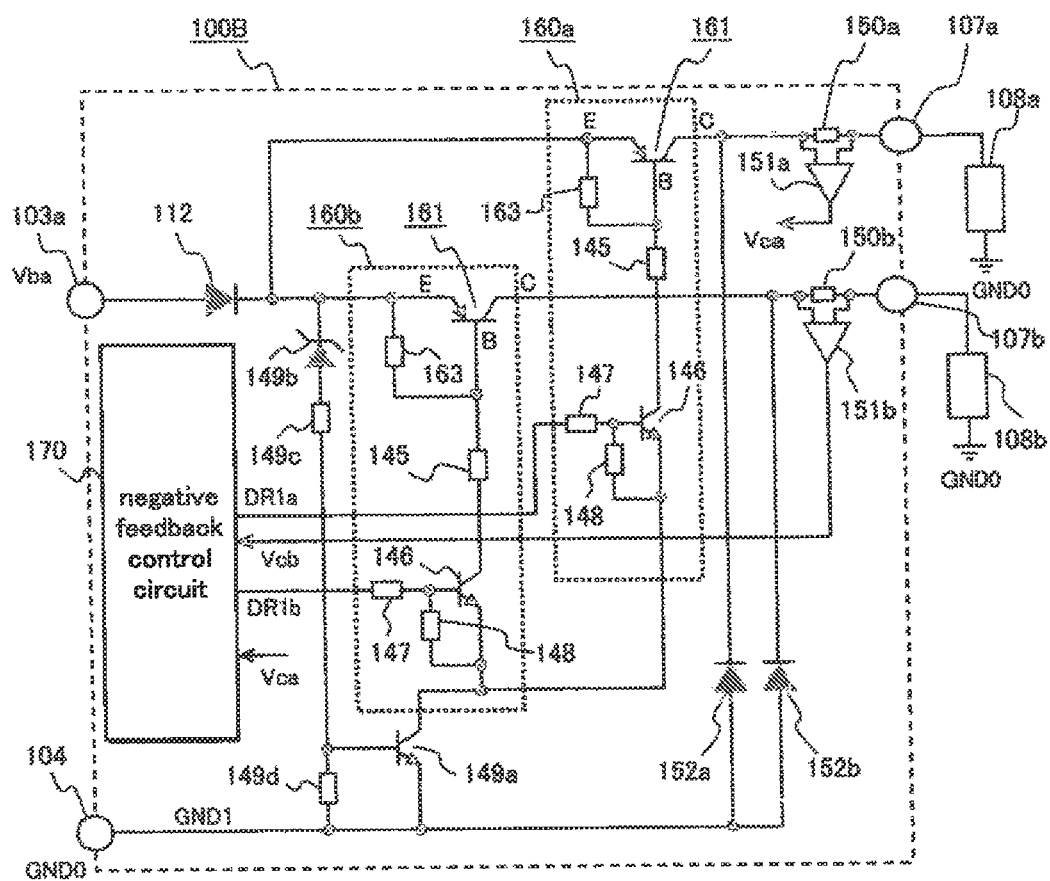
FIG. 10 is a circuit diagram showing the details of a main part of a power supply control device for inductive loads according to another embodiment of the present invention.

FIG. 10 is a main part circuit diagram showing an example using other power switching elements in FIG. 6, and the configuration will be described in detail focusing on the differences from the embodiment shown in FIG. 2.

In FIG. 10, in power switching elements 160a and 160b which are used instead of the power switching elements 140a and 140b, a junction transistor 161 is used instead of the field effect transistor 141. An emitter terminal E of the transistor 161 is connected to the reverse flow blocking diode 112, and a collector terminal C is connected to the positive terminals of the inductive loads 108a and 108b through the current detection resistors 150a and 150b.

A circuit ballast resistor 163 is connected between the emitter terminal E and the base terminal B of the transistor 161. In addition, a series circuit of the auxiliary transistor 146 and the low voltage cutoff element 149a is connected to the base circuit of the transistor 161 similar to the gate circuit of the transistor 141 shown in FIG. 2, and the driving command signals DR1a and DR1b are applied to the base terminal of each auxiliary transistor 146.

The low voltage cutoff element 149a is connected in series in common to the emitter terminal side of each auxiliary transistor 146.

The above explanation has been given on the assumption that the PNP junction transistor 161 is used instead of the P-channel field effect transistor 141. However, an N-channel field effect transistor may also be used instead of the P-channel field effect transistor 141.

In addition, also in the first embodiment, the PNP junction transistor 161 or the N-channel field effect transistor can be used instead of the P-channel field effect transistor 141.

In addition, in the above explanation, the case has been given in which the current detection resistor is connected in series to the inductive load and negative feedback control of the excitation current is performed by the microprocessor or the negative feedback control circuit configured by hardware. However, even if there is a change in the power supply voltage, when it is preferable to apply a predetermined excitation voltage to the inductive load, the current detection resistor is not necessary, and it is possible to perform open loop control in which the duty ratio of the power switching element is controlled in inverse proportion to the value of the power supply voltage.

In addition, the case has been described in which the first voltage limiting diode 109b is connected in parallel to the charging generator 109a. However, when the first voltage limiting diode 109b is not connected in parallel, a transient abnormal high voltage due to terminal disconnection of the vehicle battery is absorbed by the second voltage limiting diode 115 connected in parallel to the power capacitor 113. Therefore, in both the case of terminal disconnection of the vehicle battery and the case of the disconnection abnormality of the ground wiring line of the ground terminal 104, the power supply control devices 100A and 100B can perform abnormality detection and stop the driving of inductive loads simultaneously.

As described above, according to the power supply control device for inductive loads of the second embodiment, the comparator 127 compares the monitoring divided voltage with the predetermined analog threshold voltage Vsa, and generates the voltage abnormality determination signal ERB when the monitoring divided voltage is excessive. The voltage abnormality storage circuit 710 stores the voltage abnormality determination signal ERB as abnormality occurrence information and inputs the voltage abnormality determination signal ERB to the plurality of gate circuits 707a and 707b. The driving command signals DR1a and DR1b for the plurality of power switching elements 140a and 140b are stopped simultaneously by the plurality of gate circuits 707a and 707b. In addition, when the DC power supply 101 is connected to the power supply terminal 103b, the voltage abnormality storage circuit 710 is power-on reset by the reset pulse generating circuit 711 and accordingly the abnormality occurrence information is erased.

That is, the monitoring divided voltage by the voltage dividing resistors is compared with a predetermined analog threshold voltage by the comparison circuit. When the monitored voltage is excessive, this situation is stored in the voltage abnormality storage circuit. Driving command signals for a plurality of power switching elements are stopped simultaneously through the gate circuit, and the voltage abnormality storage circuit is power-on reset by the reset pulse generating circuit when electric power is supplied.

Therefore, even if the monitoring voltage returns to the normal state due to the stopping of the driving of the power switching element according to the occurrence of the abnormality in the monitoring voltage, the supply of electric power is not started again once the power supply is turned off. As a result, it is possible to perform abnormality determination processing without depending on the operation of the microprocessor.

In addition, the microprocessor 130B controls supply currents of the plurality of power switching elements 140a and 140b through a negative feedback control circuit 170. A program memory 131 cooperating with the microprocessor 130B includes a control program as target current setting means 904 and control abnormality processing means 905. The target current setting means 904 sets a conduction target current for each of the plurality of inductive loads 108a and 108b according to an operating state of an input sensor group 106 input to the microprocessor 130B, generates target current setting signals PWMa and PWMb that are pulse width modulation signals of a duty proportional to the conduction target current, and inputs the target current setting signal to the negative feedback control circuit 170. Current detection resistors 150a and 150b are connected in series to upstream positions of the plurality of inductive loads 108a and 108b, and output voltages of the differential amplifiers 151a and 151b that generate current detection signals Vca and Vcb proportional to voltages across the current detection resistors 150a and 150b are input to the negative feedback control circuit 170. The negative feedback control circuit 170 includes deviation signal generating circuits 704a and 704b that perform algebraic addition of at least a deviation value and a value proportional to an integral value of the deviation value according to the deviation value between a value of a smoothing signal of each of the target current setting signals PWMa and PWMb set by the target current setting means 904 and a value of each of the current detection signals Vca and Vcb, comparison circuits for duty ratio control 706a and 706b that generate the driving command signals DR1a and DR1b by comparing output voltages of the deviation signal generating circuits 704a and 704b with output voltages having predetermined periods of sawtooth wave signal generating circuits 705a and 705b, and abnormality determination comparison circuits 708a and 708b that generate control abnormality detection signals ERRa and ERRb when the output voltages of the deviation signal generating circuits 704a and 704b are outside a predetermined range. When the control abnormality detection signals ERRa and ERRb are received, the control abnormality processing means 905 stores the occurrence of a control abnormality and stops generation of the target current setting signals PWMa and PWMb.

That is, a supply current for the inductive load is detected by the current detection resistor, and is input to the negative feedback control circuit. The microprocessor sets a conduction target current according to the operating state of the input sensor group. The negative feedback control circuit controls the intermittent duty ratio of the power switching element according to the deviation value between the target current and the detection current and stores the abnormality occurrence state when the deviation value is abnormal, and stops the conduction driving of the power switching element.

Therefore, the control burden of the microprocessor for negative feedback control is reduced. In addition, disconnection abnormalities of the positive-side wiring line of any of the plurality of inductive loads, short-circuit abnormalities due to being short-circuited to the power supply line, ground abnormalities due to being short-circuited to the ground circuit, disconnection and short-circuit abnormalities of the power switching element, and disconnection and short-circuit abnormalities of the inductive load itself are detected.

In addition, when the ground terminal of the power supply control device is disconnected in a state where all power switching elements are opened, an excessive voltage equal to or higher than the power supply voltage of the DC power supply is not generated in the voltage dividing resistor. Accordingly, it is not possible to detect the disconnection abnormality. However, when the occurrence of the control abnormality is detected due to a small current flowing to each inductive load from the constant voltage power supply even though the conduction target current is zero and all of the plurality of inductive loads are in the abnormal control state, it can be determined that the ground terminal is disconnected.

In addition, the program memory 131 cooperating with the microprocessor 130B further includes a control program as disconnection abnormality processing means 906. The monitoring divided voltage generated by the voltage dividing resistors 124 and 125 is input to a comparator 127. The comparator 127 compares the monitoring divided voltage with a predetermined analog threshold voltage Vsa and generates a voltage abnormality determination signal ERB indicating that the monitoring divided voltage is excessive. The disconnection abnormality processing means 906 recognizes and stores occurrence of a disconnection abnormality of the ground wiring line in response to an input of the voltage abnormality determination signal ERB or an abnormality memory signal, which is a signal when storing the voltage abnormality determination signal ERB in the voltage abnormality storage circuit 710, to the microprocessor 130B, and stops the target current setting signals PWMa and PWMb for the plurality of power switching elements 140a and 140b simultaneously.

That is, the microprocessor recognizes and stores the occurrence of the disconnection abnormality of the ground wiring line in response to the input of the voltage abnormality determination signal by the comparator or the abnormality memory signal stored in the voltage abnormality storage circuit, and stops the target current setting signals for the plurality of power switching elements simultaneously.

Therefore, it is possible to prevent the abnormality determination comparison circuits, which detect separate control abnormalities in response to the occurrence of the disconnection abnormality of the ground wiring line, from performing undercurrent determination erroneously.

In addition, the plurality of power switching elements 140a, 140b, 160a, and 160b are field effect transistors 141 or junction transistors 161. A low voltage cutoff element 149a is connected in series to a gate circuit or a base circuit of each transistor. When a voltage across the power capacitor 113 is a value equal to or less than a predetermined low voltage, the low voltage cutoff element 149a is opened to open the plurality of power switching elements 140a, 140b, 160a, and 160b. The predetermined low voltage is a voltage corresponding to a minimum input power supply voltage required when the constant voltage power supply 120 generates the stabilization control voltage Vcc.

That is, the low voltage cutoff element that opens the power switching element when the voltage across the power capacitor becomes a minimum voltage for obtaining the stabilization control voltage is provided.

Therefore, when the ground terminal of the power supply control device is disconnected under the conditions in which all power switching elements connected in series to the plurality of inductive loads are in the complete conduction control state, the supply of electric power to the constant voltage power supply is stopped, and the charging voltage of the power capacitor is gradually decreased. Accordingly, the power switching element is opened before the microprocessor becomes inoperative, and the supply of electric power to the constant voltage power supply is resumed and the power capacitor is charged by the return current of the inductive load due to the opening of the power switching element. As a result, the microprocessor can detect the disconnection abnormality of the ground wiring line.

In addition, within the range of the present invention, the respective embodiments can be freely combined, or the respective embodiments can be appropriately changed or omitted.

Various modifications and alterations of this invention will be apparent to those skilled in the art without departing from the scope and spirit of this invention, and it should be understood that this is not limited to the illustrative embodiments set forth herein.

What is claimed is:

1. A power supply control device for inductive loads, comprising:
   a plurality of power switching elements that are provided between a DC power supply having a negative terminal connected to a ground circuit and a plurality of inductive loads and that are connected between a positive terminal of the DC power supply and a positive terminal of each of the plurality of inductive loads so as to be intermittently driven; and
   a microprocessor that performs switching control of at least the plurality of power switching elements,
   wherein electric power is supplied from the DC power supply to the power supply control device for inductive loads through a power supply terminal and a ground terminal,
   a constant voltage power supply that supplies a predetermined stabilization control voltage to the microprocessor, a power capacitor, and a voltage dividing resistor are connected in parallel to each other between the power supply terminal and the ground terminal, a commutation diode is connected between an output end of each of the plurality of power switching elements and the ground terminal, in a state where one of the plurality of power switching elements is closed and an excitation current flows through one of the plurality of inductive loads, when the closed power switching element is opened, the commutation diode is connected in a relationship in which the excitation current is commutated and attenuates through the ground terminal and the commutation diode, when a disconnection abnormality of a ground wiring line between the ground terminal and the ground circuit occurs, the excitation current flowing through one of the plurality of inductive loads flows back and attenuates through the DC power supply, the power capacitor, and the commutation diode, and the power capacitor is charged by the return current, and when a monitoring voltage that is a voltage across the power capacitor rises and a monitoring divided voltage divided by the voltage dividing resistor exceeds a predetermined threshold voltage, occurrence of a disconnection abnormality of the ground wiring line between the ground terminal and the ground circuit is detected and stored, and driving command signals for the plurality of power switching elements are simultaneously stopped according to the detection and storage of the disconnection abnormality.

2. The power supply control device for inductive loads according to claim 1, wherein the monitoring divided voltage is input to the microprocessor as a voltage monitoring signal through a multi-channel A/D converter, a program memory cooperating with the microprocessor includes a control program as disconnection abnormality determination means, when a digital conversion value of the voltage monitoring signal exceeds a predetermined digital threshold voltage, the disconnection abnormality determination means stores abnormality occurrence information due to the occurrence of the disconnection abnormality of the ground wiring line and stops the driving command signals for the plurality of power switching elements simultaneously, and the stored abnormality occurrence information is erased by a power-on reset circuit for the microprocessor or initialization means that is a control program executed at the start of an operation when electric power is supplied to the microprocessor.

3. The power supply control device for inductive loads according to claim 1, wherein the monitoring divided voltage is input to a comparator, the comparator compares the monitoring divided voltage with a predetermined analog threshold voltage and generates a voltage abnormality determination signal when the monitoring divided voltage is excessive, the voltage abnormality determination signal is stored as abnormality occurrence information by a voltage abnormality storage circuit and is input to a plurality of gate circuits through the voltage abnormality storage circuit, and the driving command signals for the plurality of power switching elements are simultaneously stopped by the plurality of gate circuits, and when the DC power supply is connected to the power supply terminal, the voltage abnormality storage circuit is power-on reset by a reset pulse generating circuit to erase the abnormality occurrence information.

4. The power supply control device for inductive loads according to claim 1, wherein a current detection resistor is connected in series to an upstream position of each of the plurality of inductive loads, an output voltage of a differential amplifier that generates a current detection signal proportional to a voltage across the current detection resistor is input to the microprocessor through the multi-channel A/D converter, a program memory cooperating with the microprocessor includes a control program as target current setting means and negative feedback control means, the target current setting means sets a value of a conduction target current for each of the plurality of inductive loads according to an operating state of an input sensor group input to the microprocessor, the negative feedback control means calculates a deviation value between the value of the conduction target current set by the target current setting means and a value of the current detection signal and generates a negative feedback control signal by performing algebraic addition of at least the deviation value and a value proportional to an integral value of the deviation value, and determines whether or not a value of the negative feedback control signal is a value in a predetermined range, when the value of the negative feedback control signal is in the predetermined range, a power switching element for the selected inductive load of the plurality of inductive loads is intermittently driven by generating the driving command signal based on a current duty proportional to the value of the negative feedback control signal, and control abnormality processing means for storing occurrence of a control abnormality and stopping conduction driving of the power switching element for the selected inductive load when the value of the negative feedback control signal is outside the predetermined range is included in the negative feedback control means.

5. The power supply control device for inductive loads according to claim 1, wherein the microprocessor controls a supply current of the plurality of power switching elements through a negative feedback control circuit, a program memory cooperating with the microprocessor includes a control program as target current setting means and control abnormality processing means, the target current setting means sets a conduction target current for each of the plurality of inductive loads according to an operating state of an input sensor group input to the microprocessor, generates a target current setting signal that is a pulse width modulation signal of a duty proportional to the conduction target current, and inputs the target current setting signal to the negative feedback control circuit, a current detection resistor is connected in series to an upstream position of each of the plurality of inductive loads, and an output voltage of a differential amplifier that generates a current detection signal proportional to a voltage across the current detection resistor is input to the negative feedback control circuit, the negative feedback control circuit includes a deviation signal generating circuit that performs algebraic addition of at least a deviation value and a value proportional to an integral value of the deviation value according to the deviation value between a value of a smoothing signal of the target current setting signal set by the target current setting means and a value of the current detection signal, a comparison circuit for duty ratio control that generates the driving command signal by comparing an output voltage of the deviation signal generating circuit with an output voltage having a predetermined period of a sawtooth wave signal generating circuit, and an abnormality determination comparison circuit that generates a control abnormality detection signal when the output voltage of the deviation signal generating circuit is outside a predetermined range, and when the control abnormality detection signal is received, the control abnormality processing means stores the occurrence of a control abnormality and stops generation of the target current setting signal.

6. The power supply control device for inductive loads according to claim 5, wherein the program memory cooperating with the microprocessor further includes a control program as disconnection abnormality processing means, the monitoring divided voltage by the voltage dividing resistor is input to a comparator, the comparator compares the monitoring divided voltage with a predetermined analog threshold voltage and generates a voltage abnormality determination signal when the monitoring divided voltage is excessive, and the disconnection abnormality processing means recognizes and stores occurrence of a disconnection abnormality of the ground wiring line in response to an input of the voltage abnormality determination signal or an abnormality memory signal, which is a signal when storing the voltage abnormality determination signal in the voltage abnormality storage circuit, to the microprocessor, and stops the target current setting signal for the plurality of power switching elements simultaneously.

7. The power supply control device for inductive loads according to claim 1, wherein the plurality of power switching elements are field effect transistors or junction transistors, a low voltage cutoff element is connected in series to a gate circuit or a base circuit of each transistor, when a voltage across the power capacitor is a value equal to or less than a predetermined low voltage, the low voltage cutoff element is opened to open the plurality of power switching elements, and the predetermined low voltage is a voltage corresponding to a minimum input power supply voltage required when the constant voltage power supply generates the stabilization control voltage.

8. The power supply control device for inductive loads according to claim 1, wherein the DC power supply is a vehicle battery charged by a charging generator, a first voltage limiting diode having a first limiting voltage of a larger value than a maximum charging voltage of the vehicle battery is connected in parallel to the charging generator, a second voltage limiting diode having a second limiting voltage, which is a larger value than the first limiting voltage by the first voltage limiting diode, is connected in parallel to the power capacitor, the second limiting voltage is a value less than allowed withstand voltages of the power capacitor and the constant voltage power supply, and a threshold monitoring voltage, which is a voltage across the power capacitor when the monitoring divided voltage becomes equal to the threshold voltage, is a value exceeding a maximum charging voltage of the DC power supply, and is a value less than the first limiting voltage.

9. The power supply control device for inductive loads according to claim 1, wherein the DC power supply is a vehicle battery charged by a charging generator, a first voltage limiting diode having a first limiting voltage of a larger value than a maximum charging voltage of the vehicle battery is connected in parallel to the charging generator, a second voltage limiting diode having a second limiting voltage, which is a larger value than the first limiting voltage by the first voltage limiting diode, is connected in parallel to the power capacitor, the second limiting voltage is a value less than allowed withstand voltages of the power capacitor and the constant voltage power supply, and a threshold monitoring voltage, which is a voltage across the power capacitor when the monitoring divided voltage becomes equal to the threshold voltage, is a value exceeding the first limiting voltage, and is a value less than the second limiting voltage.

\* \* \* \* \*